US012148323B1

(12) United States Patent
Chesnutis

(10) Patent No.: US 12,148,323 B1
(45) Date of Patent: Nov. 19, 2024

(54) SYSTEM FOR STORING TRADING CARDS, MEMORABILIA CASE, METHOD FOR OBTAINING AN AUTOGRAPH(S) ON A TRADING CARD(S) STORED IN A PROTECTIVE CASE, AND/OR METHOD OF MAKING SAME

(71) Applicant: Michael Chesnutis, Columbia, MD (US)

(72) Inventor: Michael Chesnutis, Columbia, MD (US)

( * ) Notice: Subject to any disclaimer, the term of this patent is extended or adjusted under 35 U.S.C. 154(b) by 0 days.

(21) Appl. No.: 18/215,260

(22) Filed: Jun. 28, 2023

Related U.S. Application Data

(63) Continuation of application No. 17/842,601, filed on Jun. 16, 2022, now Pat. No. 11,735,069.

(60) Provisional application No. 63/211,857, filed on Jun. 17, 2021.

(51) Int. Cl.
*G09F 1/10* (2006.01)
*A45C 11/18* (2006.01)
*B65B 5/04* (2006.01)

(52) U.S. Cl.
CPC ................ *G09F 1/10* (2013.01); *A45C 11/18* (2013.01); *B65B 5/04* (2013.01)

(58) Field of Classification Search
CPC .................................. G09F 1/10; A45C 11/18
See application file for complete search history.

(56) References Cited

U.S. PATENT DOCUMENTS

| | | | | |
|---|---|---|---|---|
| 5,159,964 | A * | 11/1992 | Baker | B42F 5/04 150/147 |
| 5,186,566 | A * | 2/1993 | Cameron | B42F 5/00 402/79 |
| 6,149,003 | A | 11/2000 | Day | |
| 9,597,919 | B1 | 3/2017 | Ruggles | |
| 2006/0117618 | A1 | 6/2006 | Wilcoxen | |
| 2007/0072162 | A1 | 3/2007 | Honadel | |
| 2008/0000127 | A1 | 1/2008 | Shimer | |
| 2008/0120874 | A1 | 5/2008 | Schroeder | |
| 2009/0019738 | A1 | 1/2009 | Cunningham | |
| 2011/0031139 | A1 | 2/2011 | Macor | |
| 2011/0078932 | A1 | 4/2011 | Wilcoxen | |

* cited by examiner

*Primary Examiner* — Jacob K Ackun
(74) *Attorney, Agent, or Firm* — GARCIA-ZAMOR INTELLECTUAL PROPERTY LAW, LLC; Ruy Garcia-Zamor

(57) ABSTRACT

A case, system, and/or method relating to trading cards, sports memorabilia, coins, printed matter, or the like (herein referred to as "collectibles"). The case and/or method may allow for better protection while obtaining signatures thereon. The case may be used with one or more collectibles to facilitate the pleasure of hobbyists in growing and maintain one or more collectibles and to simplify the maintenance, storage, and transportation of collections.

18 Claims, 12 Drawing Sheets

SYSTEM FOR STORING TRADING CARDS, MEMORABILIA CASE, METHOD FOR OBTAINING AN AUTOGRAPH(S) ON A TRADING CARD(S) STORED IN A PROTECTIVE CASE, AND/OR METHOD OF MAKING SAME

CROSS-REFERENCE TO RELATED APPLICATIONS

This application claims priority to the following applications: (1) U.S. patent application Ser. No. 17/842,601, filed on Jun. 16, 2022; and (2) U.S. Provisional Patent Application 63/211,857, filed Jun. 17, 2021, each of which is incorporated by reference as if set forth in its entirety herein.

BACKGROUND

The present invention relates generally to trading card holders. More specifically the preferred embodiments of the present invention relate to a system and/or method for protecting trading cards.

It may be advantageous to provide a trading card holding system and/or method preferably, but not necessarily, having at least one of: a structure which may allow the card contained within top be simultaneously protected from physical damage while having a portion that can be accessed such that signatures can be placed thereon without removing the trading card from its case; provide an improved method for securing trading cards within a case; provide an improved method for placing trading cards within a case; provide an improved method for viewing the trading cards; providing an improved method for allowing trading cards to be autographed; provide an improved method to join individual trading card holders to one another; that is efficient to manufacture; easy to use; aesthetically pleasing; and/or easily transported.

SUMMARY

In one embodiment, the present invention is directed to a method of presenting a trading card for autographing. The method including the step of: providing a case. The case may include a portfolio body having a first panel and a second panel. The first panel having a first edge. The first panel and the second panel forming a pocket configured to receive the trading card. The first panel defining an aperture therethrough. Wherein the second panel underlies the first panel and extends outwardly therefrom past the first edge of the first panel to form a protruding section of the portfolio body. The first panel and the second panel forming a passageway therebetween to access the pocket. Wherein the passageway extends past the first edge and a border between the protruding section and a remainder of the second panel. The method further including the steps of: inserting a trading card into the portfolio body by sliding the trading card through the passageway into the pocket; and orienting the trading card such that a first portion of the trading card on which an autograph is desired is aligned with the aperture while a second portion of the trading card is sandwiched between the first panel and the second panel.

In another aspect, the present invention is directed to a method of presenting a trading card for autographing. The method comprising the step of: providing a case. The case may include a portfolio body having a first panel and a second panel. The first panel and the second panel forming a pocket configured to contain the trading card. The first panel defining an aperture therethrough. Wherein the first panel is moveable between a first, closed position in which the first panel is configured to overlie the trading card when the trading card is located within the portfolio body and a second, open position in which the case is configured to allow direct access to a first portion of the trading card for signing when the trading card is located therein. The method of the present invention also including the steps of inserting a trading card into the portfolio body by of moving the first panel from the first, closed position, to the second, open position by pivoting the first panel away from the second panel along the hinge; orienting the trading card such that a first portion of the trading card on which an autograph is desired is aligned with the aperture while a second portion of the trading card is sandwiched between the first panel and the second panel.

In another aspect, the present invention is directed to a method of presenting a trading card for autographing. The method including the step of providing a portfolio sheet. The portfolio sheet may include a plurality of portfolio bodies. Each portfolio body may include a first panel and a second panel. The first panel has a first edge. The first panel and the second panel form a pocket configured to receive the trading card. The first panel defines an aperture therethrough. Wherein the second panel underlies the first panel and extends outwardly therefrom past the first edge of the first panel to form a protruding section of the portfolio body. The first panel and the second panel forming a passageway therebetween to access the pocket. Wherein the passageway extends past the first edge and a border between the protruding section and a remainder of the second panel. The portfolio body having: (1) a first, vertical joining edge, (2) a second, vertical joining edge, (3) a first, horizontal joining edge, and (4) a second, horizontal joining edge; and the portfolio body being engaged to at least three of the plurality of portfolio bodies. The at least three of the portfolio bodies can be engaged with the portfolio body via a separate one of: (1) the first, vertical joining edge, (2) the second, vertical joining edge, (3) the first, horizontal joining edge, and (4) the second, horizontal joining edge thereof, such that the plurality of portfolio bodies forms a portfolio sheet. The method further includes the steps of inserting a trading card into the portfolio sheet by sliding the trading card through the passageway into the pocket of one of the plurality of portfolio bodies; and orienting the trading card such that a first portion of the trading card on which an autograph is desired is aligned with the aperture while a second portion of the trading card is sandwiched between the first panel and the second panel.

In a separate aspect the present invention is directed to a case system configured to hold a trading card to be autographed. The case may include a portfolio body having a first panel and a second panel. The first panel has a first edge. The first panel and the second panel form a pocket configured to receive the trading card. The first panel defines an aperture therethrough. Wherein the second panel underlies the first panel and extends outwardly therefrom past the first edge of the first panel to form a protruding section of the portfolio body. The first panel and the second panel can form a passageway therebetween to access the pocket. Wherein the passageway extends past the first edge and a border between the protruding section and a remainder of the second panel. The first panel and the second panel being transparent. The protruding section of the second panel having an embossment thereon to form a grip enhancement.

In another aspect the present invention is directed to a case system configured to hold a trading card to be autographed. The case may include a portfolio body having a first panel and a second panel. The first panel has a first edge. The first panel and the second panel form a pocket configured to receive the trading card. The first panel defines an aperture therethrough. Wherein the second panel underlies the first panel and extends outwardly therefrom past the first edge of the first panel to form a protruding section of the portfolio body. The first panel and the second panel form a passageway therebetween to access the pocket. Wherein the passageway extends past the first edge and a border between the protruding section and a remainder of the second panel. The first panel and the second panel being transparent. Wherein the portfolio body is one of a plurality of portfolio bodies which forms a portfolio sheet.

In a separate aspect, one embodiment of the present invention is directed to a method of storing the trading card in a pouch located between two surfaces. In this embodiment the card is placed into the pouch by way of the passage defined by an open space at the top of the first major surface. The second surface extends past the first major surface such that there is a small area where the two surfaces do not overlap on which texturing such as an embossment can be placed to provide grip on the case.

In a separate aspect the present invention is directed to a method of storing a trading card in a protective case such that it is easily accessible for storage and signature.

In a separate aspect the present invention is directed to a method of storing the trading card in a storage area located between two surfaces. The trading card is placed into the storage area by way of the passageway defined by an open space at the top of the first major surface. The first major surface has an aperture on it through which a trading card contained within may be signed.

In a separate aspect the present invention is directed to a method of storing the trading card in a purse located between two sections. The trading card is placed into the purse by way of the passage defined by an open space at the top of the first section. The first major surface has a window on it through which a trading card contained within may be signed.

In another aspect the present invention is directed to a method of storing the trading card in a pouch located within the case. The trading card is placed into the pouch through a passageway defined by an open space at the top of the first major surface. The second major surface extends past the first major surface such that there is an area where the two surfaces do not overlap.

In a separate aspect, the present invention is directed to a method of securing a trading card in a protective case such that it can be signed. The method preferably includes the steps of: providing a case with a pouch located between two surfaces; placing the trading card into the pouch such that is friction fit between the two surfaces; orienting the trading card such that a portion of the trading card on which an autograph is desired is aligned with an aperture on the case such that it can be easily signed.

In a separate aspect, the present invention is directed to a method of securing a trading card in a protective case such that it can be signed. The method preferably includes the steps of: providing a case with a pouch located between two surfaces; placing the trading card into the pouch such that it is friction fit between the two surfaces; orienting the trading card such that a portion of the trading card on which an autograph is desired is aligned with an aperture on the case such that it can be easily signed; and presenting the trading card for autographing.

In a separate aspect, the present invention is directed to a method of securing a trading card in a protective case such that it can be signed. The method preferably includes the steps of: providing a case with a pouch located between two surfaces; placing the trading card into the pouch such that is friction fit between the two surfaces; orienting the trading card such that a portion of the trading card on which an autograph is desired is aligned with an aperture on the case such that it can be easily signed; presenting the trading card for signing; and transporting the signed card.

In a separate aspect, the present invention is directed to a method of securing a trading card in a protective case such that it can be signed. The method preferably includes the steps of: providing a case with a pouch located between two surfaces; placing the trading card into the pouch such that is friction fit between the two surfaces; orienting the trading card such that a portion of the trading card on which an autograph is desired is aligned with an aperture on the case such that it can be easily signed; presenting the trading card for signing; and transporting the signed card.

In a separate aspect, the present invention is directed to a method of securing trading cards in a protective case such that they can be signed. The method preferably includes the steps of, providing a case with a first major surface and a second major surface that are joined along one transverse edge; pivoting the first major surface away from the second major surface along the transverse edge; inserting a trading card into the case; and pivoting the first major surface towards the second major surface by rotating it about the transverse edge. More preferably the first major surface and the second major surface are joined along their transverse edge by a hinge about which the first major surface can be rotated.

In a separate aspect, the present invention is directed to a method of securing trading cards in a protective case such that they can be signed. The method preferably includes the steps of, providing a case with a pocket for holding a trading card; inserting a trading card into the case; and presenting the case for autographing.

In a separate aspect, the present invention is directed to a method of securing trading cards in a protective case such that they can be signed. The method preferably includes the steps of, providing a case with a pocket for holding a trading card; inserting a trading card into the case; presenting the case for the autographing of the card contained within; and having said card autographed.

In a separate aspect, the present invention is directed to a method of securing trading cards in a protective case such that they can be signed. The method preferably includes the steps of, providing a case with a pocket for holding a trading card; inserting a trading card into the case; presenting the case for the autographing of the card contained within; having said card autographed; and transporting said card. More preferably the step of transporting the card while the card is in the case prevents the trading card from being bent or creased.

In a separate aspect the present invention is directed to a method of storing a trading card in a protective case to reduce instances of the trading card being bent or creased.

In a separate aspect the present invention is directed to a method of storing a trading card in a protective case.

In a separate aspect, the present invention is directed to a protective case for a trading card including a portfolio body having a first panel and a second panel. The first panel may have a first edge. The first panel and the second panel can form a pocket configured to receive the trading card. The first panel may define an aperture therethrough. Wherein the second panel may underlie the first panel and extend outwardly therefrom past the first edge of the first panel to form a protruding section of the portfolio body. The first panel and the second panel preferably forming a passageway therebetween to access the pocket. Wherein the passageway extends past the first edge and a border between the protruding section and a remainder of the second panel. The first panel and the second panel preferably being at least one of non-opaque, translucent, and/or transparent.

In a separate aspect, the present invention is directed to a protective case for a trading card including a portfolio body. The portfolio body having an aperture therein to allow signing of the trading card. The portfolio body preferably being at least one of non-opaque, translucent, and/or transparent.

In a separate aspect, the present invention is directed to a protective case for a trading card including a portfolio body. The portfolio body having an aperture therein to allow signing of the trading card which has a moveable cover thereover such that when the cover is moved, the trading card can be signed. After signing, the cover can be returned to its original position to fully protect the trading card. The portfolio body preferably being at least one of non-opaque, translucent, and/or transparent.

In a separate aspect, the present invention is directed to a protective case for a trading card including a portfolio body. The portfolio body having an aperture therein to allow signing of the trading card which has a moveable cover thereover such that when the cover is moved, the trading card can be signed. After signing, the cover can be returned to its original position to fully protect the trading card.

In a separate aspect, the present invention is directed to a protective case for a trading card. The protective case preferably being at least one of non-opaque, translucent, and/or transparent.

In a separate aspect, the present invention is directed to a protective case for a trading card.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings:

In FIG. 8 the first major surface 32 and the second major surface 34 are not joined. In this embodiment of the case 30, preferably the inside of the first major surface 32 has a first connection lip 64 and the inside of the second major surface 34 has a second connection lip 66. Preferably located at the four corners of the first connection lip 64 are four first polarity magnets 114. Preferably located at the four corners of the second connection lip 66 are four second polarity magnets 116. Preferably the first polarity magnets 114 all have the same polarity. Preferably the second polarity magnets 116 all have opposite polarities to those of the first polarity magnets 114 such that the first polarity magnets 114 are attracted magnetically to the second polarity magnets 116. The right external edge of the first connection lip 64 may constitute a first right minor surface section 90. The left external edge of the first connection lip 64 may constitute a first left minor surface section 92. The bottom external edge of the first connection lip 64 may constitute a first bottom minor surface section 94. The top external edge of the first connection lip 64 may constitute a first top minor surface section 96. The right external edge of the second connection lip 64 may constitute a second right minor surface section 98. The left external edge of the second connection lip 64 may constitute a second left minor surface section 100. The bottom external edge of the second connection lip 64 may constitute a second bottom minor surface section 102. The top external edge of the second connection lip 64 may constitute a second top minor surface section 104. The planar space within the bounds of the first connection lip 64 may define a first pocket section 84. The planar space within the bounds of the second connection lip 66 may define a second pocket section 86. A trading card 142 may be placed in the second pocket section 86 and the first major surface 32 may be separably joined to the second major surface 34 by bringing the first major surface 32 within a proximity of the second major surface 34 such that the magnetic fields of the first polarity magnets 114 overlap with the magnetic fields of the second polarity magnets 116. When the magnetic fields of the first polarity magnets 114 overlap with the magnetic fields of the second polarity magnets 116, magnetic attractive forces may separably hold the first major surface 32 to the second major surface 34. When the first major surface 32 is joined to the second major surface 34 the first pocket section 86 and the second pocket section 88 may define a pocket 46 wherein the trading card 142 may be stored. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.

In FIG. 10 the pocket access door 120 is in the second, open position. At the top of the left minor surface 56 there preferably is a pocket access door latch 124. Preferably at the distal end of the pocket access door 120 there is a pocket access door pin 126. When the pocket access door 120 is in the second, open position the space between the top of the first major surface 32 and the top of the second major surface 34 defines a passageway 36. The first major surface 32 and the second major surface 34 define a pocket 46 between them into which a trading card 142 can be placed. The pocket 46 is accessed by sliding the trading card 142 through the passageway 36. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.

In FIG. 20 the case system comprises a portfolio sheet 142. The portfolio sheet 140 preferably includes a plurality of portfolio bodies 30. The portfolio bodies 30 may each preferably include a first panel 32 and a second panel 34, wherein the second panel 34 has a border and the first panel 32 and the second panel 34 form a pocket 46 configured to receive a trading card 142. Preferably the first panel 32 and a second panel 34 are not completely opaque. More preferably the first panel 32 and second panel 34 and second panel 34 are transparent. Preferably the first panel 32 defines an aperture 50 therethrough. The second panel 34 may underlie the first panel 32 and preferably, but not necessarily, extends upwardly past the first edge of the first panel 32 to form a case system lip 47. The case system lip 47 is preferably large enough to accommodate texturing. More preferably the case system lip 47 has texturing is in the form of embossment which forms a grip enhancement portion 48 of the case 30. More preferably the grip enhancement portion 48 of the case 30 is only present on the top of the portfolio sheet 140. Preferably below the case system lip 47 in between the first panel 32 and the second panel 34, the panels define a pocket 46. The pocket 46 may be accessed from a passageway 36 which is defined by the space between the first major surface 32 and a remainder of the second panel 34 (which is the portion of the second panel 34 on an opposite side of the border 44 from the protruding section 47). Preferably the portfolio body 30 has a first, vertical joining edge 54, a second vertical joining edge 56, a first, horizontal joining edge 58 and a second, horizontal joining edge 60. More preferably the portfolio body 30 is engaged to at least three of the plurality of portfolio bodies 30 via separately one of the first vertical joining edge 52, the second vertical joining edge 54, the first horizontal joining edge 56 and the second horizontal joining edge 58 thereof such that the portfolio sheet 140 is formed out of the plurality of portfolio bodies 30. Those of ordinary skill in the art will appreciate from this disclosure that the protruding section can be omitted, or replaced with a multi-layer or multi-component piece without departing from the scope of the present invention.

In FIG. 21 the case system may comprise a portfolio sheet 140. The portfolio sheet 140 may include a plurality of portfolio bodies 30. Preferably the portfolio bodies 30 further comprise a first major surface 32 and a second major surface 34, wherein the first major surface 32 and the second major surface 34 form a pocket 46 configured to receive a trading card 142. The portfolio bodies 30 also may have a top minor surface 60, a bottom minor surface 58, a left minor surface 56, and a right minor surface 54. Preferably the first major surface 32 defines an aperture 50 therethrough. Preferably the portfolio body 30 has male slide joint 136 on its top minor surface 60, and its left minor surface 56 and female slide joints 138 on its bottom minor surface 58 and right minor surface 54. Preferably the portfolio body 30 can be detachably engaged to other portfolio bodies 30 by way of connecting a male slide joint 136 of one portfolio body 30 to the female slide joint 130 of another portfolio body 30 thereby creating a portfolio sheet 140.

DETAILED DESCRIPTION OF THE PREFERRED EMBODIMENT

Figure 1:
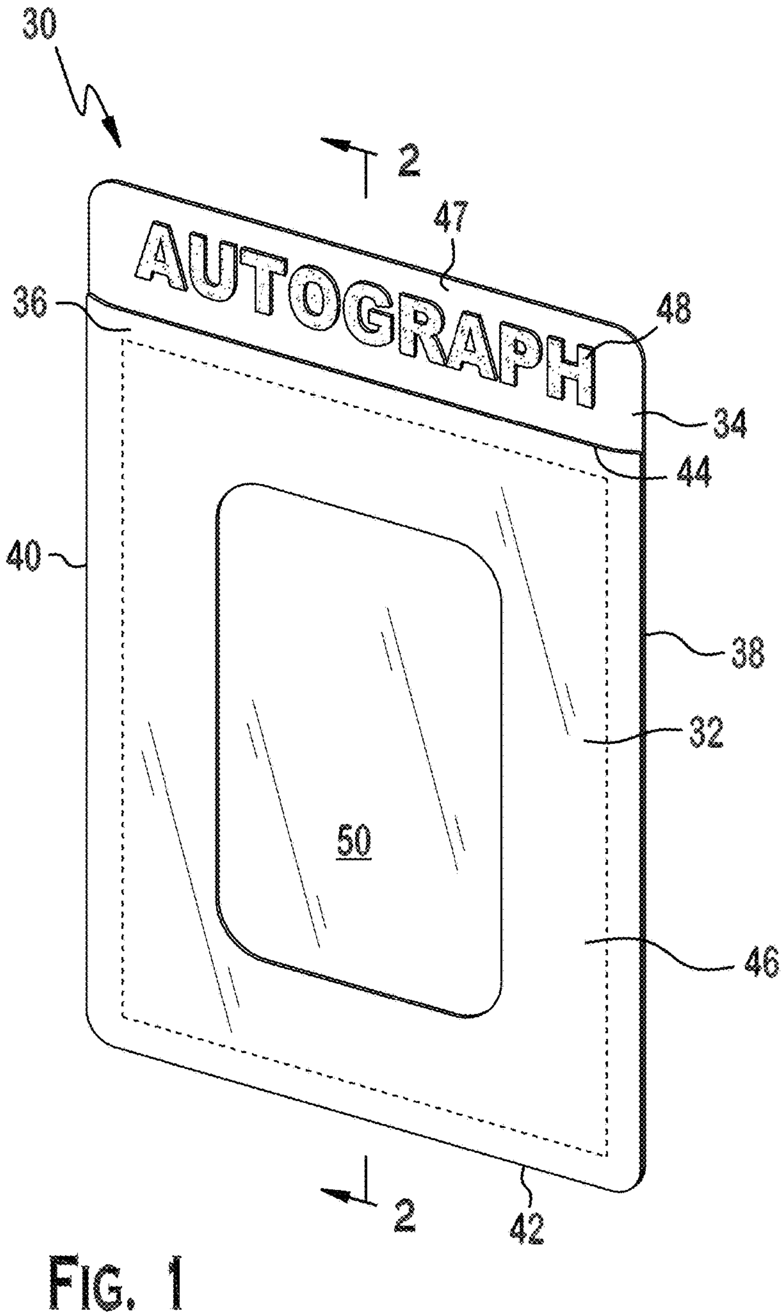
FIG. 1 is a three quarters perspective view of one preferred embodiment of the case 30 of the present invention. The case 30 preferably, but not necessarily, has a first major surface 32 and a second major surface 34. The first major surface 32 and the second major surface 34 preferably are joined on the right side of the case 30 at a right edge 38, at the left side of the case 30 at a left edge 40, and at the bottom of the case 30 at a bottom edge 42. At the top of the first major surface 32 there may be a passageway 36 defined therein by the absence of a connection between the first major surface 32 and the second major surface 34 at the top of the first major surface 32. The top of the first major surface 32 is aligned with the border 44 on the second panel 34 which together combine to form a mouth/opening to the passageway 36. Between the first major surface 32 and the second major surface 34 there may be a pocket 46 into which a trading card 142 can be placed. The pocket 46 is accessed by sliding the trading card 142 through the passageway 36. The second major surface 34 extends past the border 44 of the second major surface 34 to form a case system lip 47. The case system lip 47 preferably has a grip portion 48 embossed or otherwise textured thereon. The center of the first major surface may define a front aperture 50 which provides direct access to a trading card 142 stored in the pocket 46 for autographing.
Figure 2:
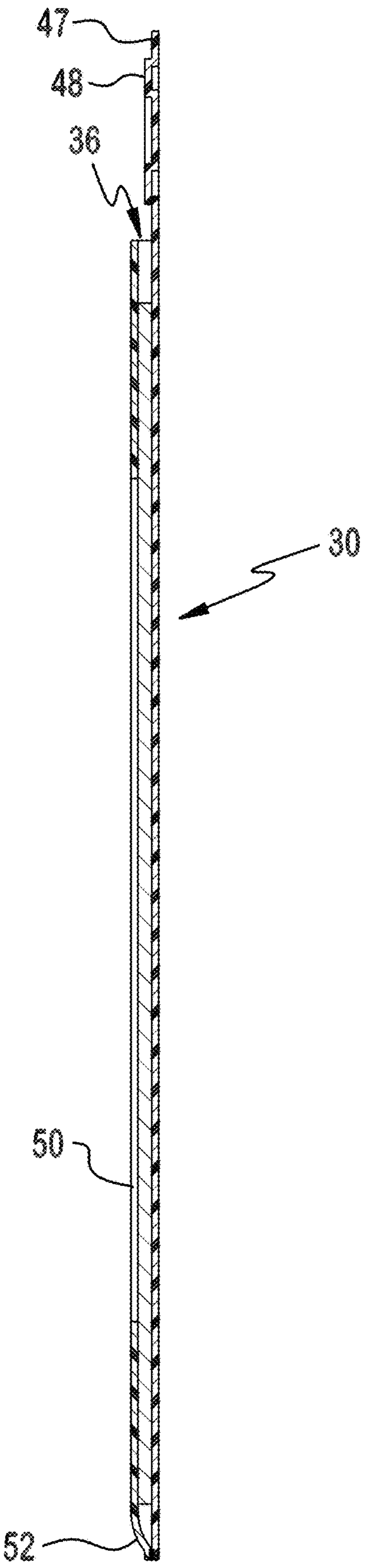
FIG. 2 is a cross-sectional view of the case 30 of FIG. 1 as taken along the lines 2-2 in FIG. 1. The first major surface 32 is preferably joined to the second major surface 34 at the bottom edge 42, immediately before which is a tapered portion 52 of the first major surface 32.

Certain terminology is used in the following description for convenience only and is not limiting. The words “right,” “left,” “up,” and “down” designate the directions as they would be understood by a person facing in the viewing direction unless specified otherwise. At least one of the embodiments of the present invention is accurately represented by this application’s drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words “outer” and “inner” refer to directions away from and toward, respectively, the geometric center of the specified element, or, if no part is specified, the geometric center of the case 30. The terms “downward” and “upward refers to directions above and below the center of the case 30, respectively, unless specified otherwise. The terms “forward” and “front” refer to a direction in front of the case 30 and the term “rear” refers to a direction behind the case 30. The terms “axial” and “radial” refer to directions towards and away from the center of the case respectively. The terms “touching,” “abutting,” “against,” and “contacting” when used in connection with two surfaces is defined as meaning “being positioned anywhere between actual touching of two surfaces to being in facing orientation and within 1 inch (or 2.54 centimeters) apart.” Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language “at least one of ‘A’, ‘B’, and ‘C’,” as used in the claims and in corresponding portions of the specification, means “any group having at least one ‘A’; or any group having at least one ‘B’; or any group having at least one ‘C’; —and does require that a group have at least one of each of ‘A’, ‘B’, and ‘C’.” More specifically, the language ‘at least two/three of the following list’ (the list itemizing items ‘1’, ‘2’, ‘3’, ‘4’, etc.), as used in the claims, means at least two/three total items selected from the list and does not mean two/three of each item in the list. The term "transverse," as used in the specification, means "situated or extending across something, such as along a side of an object." The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring to FIGS. 1-23, a case system according to preferred embodiments of the present invention is shown. Multiple preferred implementations of the preferred methods of the present invention will be described below (alone or in combination with various embodiments of the case system). The steps of the methods of the present invention can be performed in any order, omitted, or combined without departing from the scope of the present invention. As such, optional or required steps described in conjunction with one implementation of the method can also be used with another implementation or omitted altogether. Additionally, unless otherwise stated, similar structure or functions described in conjunction with the below methods preferably, but not necessarily, operate in a generally similar manner to that described elsewhere in this application.

One preferred embodiment of the present invention is directed to a method of storing a trading card 142 (herein referred to also as a "card" or "collectable card") in a protective case 30 (herein referred to also as a "case" and a "portfolio body") such that the trading card 142 is easily accessible for signature. Those of ordinary skill in the art will appreciate from this disclosure that the term "trading card 142," as used in the specification and the claims, means "any one of a baseball card, football card, game card, collectible card, playbill, ticket, trading game card, playing card, certificate, paper currency, coin or combination coin and presentation/matting backing, or the like" without departing from the scope of the present invention.

Alternatively, the present invention is directed to a method of securing a trading card 142 in a protective case 30 such that it can be signed. The method preferably includes the steps of: providing a case 30 with a pouch 46 (herein referred to also as a "pocket", "purse" and/or a "storage area") located between a first panel 32 (herein referred to also as a "first major surface" of the case) and a second panel 34 (herein referred to also as a "second major surface" of the case); placing the trading card 142 into the pouch 46 such that the trading card 142 may be friction fit between the first panel 32 and the second panel 34; orienting the trading card 142 such that a portion of the trading card 142 on which an autograph is desired is aligned with an aperture 50 (herein referred to also as a "window" or a "front aperture") on the case 30 such that it can be easily signed. Those of ordinary skill in the art will appreciate from this disclosure that the trading card 142 could be loosely fit or otherwise secured in the pouch 46 without departing from the scope of the present invention.

In another embodiment the present invention is directed to a method of storing the trading card 142 in a pocket 46 located between the panels. The trading card 142 can be placed into the pouch 46 by way of the opening defined by an open space 36 (herein referred to also as a "passageway" and/or a "passage") at the top of the first major surface 32. The second panel 34 extends past the first major surface 32 such that there is an area where the two panels do not overlap on which texturing such as an embossment is located which forms a grip enhancement portion 48 (herein referred to also as a "textured grip" and/or a "grip portion").

Referring now to FIG. 1, the case system may comprise a portfolio body 30 that has a first panel 32 and the second panel 34. Preferably the first panel 32 and second panel 34 are not completely opaque. More preferably first panel 32 and second panel 34 are transparent. Preferably the first panel 32 defines an aperture 50 therethrough. The second panel 34 may underlie the first panel 32 and extend upwardly past the first edge of the first panel 32 to form a protruding section of the second panel 47 (herein also referred to as a "case system lip"). The protruding section of the second panel 47 is preferably large enough to accommodate texturing. More preferably this texturing is in the form of embossment on the case system lip 47 which forms the textured grip 48 of the case 30. Preferably below the case system lip 47 between the first panel 32 and the second panel 34, the panels define a pocket 46. The pocket 46 may be accessed from a passageway 36. The pocket opening/mouth may be defined by the space between the first edge of the first major surface 32 and a the border 44 of the second major surface 34.

Still referring to FIG. 1, preferably the portfolio body 30 is slightly larger than a trading card 142 such that the pocket 46 can accommodate one trading card 142 and hold it in place between the first panel 32 and the second panel 34 through friction. More preferably the case 30 measures between thirty-three millimeters (33 mm) and ninety-five millimeters (95 mm) horizontally, and between fifty-eight millimeters (58 mm) and one hundred-twenty millimeters (120 mm) vertically. More preferably the case 30 measures between fifty-three millimeters (53 mm) and seventy-five millimeters (75 mm) horizontally, and between seventy-eight millimeters (78 mm) and one hundred millimeters (100 mm) vertically. Most preferably the case 30 measures between sixty-three millimeters (63 mm) and sixty-five millimeters (65 mm) horizontally and eighty-eight millimeters (88 mm) and ninety millimeters (90 mm) vertically; roughly corresponding to the standard size of many collectible cards. The aperture 50 of the case 30 preferably measures between thirteen millimeters (13 mm) and seventy-five millimeters (75 mm) horizontally and thirty-eight millimeters (38 mm) and one hundred millimeters (100 mm) vertically. More preferably the aperture 50 of the case 30 measures between thirty-three millimeters (33 mm) and fifty-five millimeters (55 mm) horizontally and fifty-eight millimeters (58 mm) and eighty millimeters (80 mm) vertically. Most preferably the aperture 50 of the case 30 measures between forty-three millimeters (43 mm) and forty-five millimeters (45 mm) horizontally and sixty-nine millimeters (69 mm) and seventy millimeters (70 mm) vertically. However, those of ordinary skill in the art will appreciate from this disclosure that any suitable/desired dimensions can be used without departing from the scope of the present invention.

While the case 30 shown in FIG. 1 is preferably configured for holding a single card 142, those of ordinary skill in the art will appreciate from this disclosure that the case 30 could be configured to hold multiple trading cards 142. That is the trading cards 142 can be stacked one on top of the other, positioned side-by-side, or a combination of both without departing from the scope of the present invention.

Still referring to FIG. 1, the case system may include a portfolio body 30 that has a first panel 32 and a second panel 34. Preferably the first panel 32 and the second panel 34 are not completely opaque. More preferably the first panel 32 and second panel 34 are transparent. Preferably the first panel 32 defines an aperture 50 therethrough. The second panel 34 may underlie the first panel 32 and extend upwardly past the first edge of the first panel 32 to form a case system lip 47. The protruding section of the second panel 47 is preferably large enough to accommodate texturing. More preferably this texturing is in the form of embossment on the protruding section which forms a textured grip 48. Preferably below the case system lip 47 between the first panel 32 and the second panel 34, the panels define a pocket 46. The pocket 46 may be accessed from a passageway 36 which is defined by the space between the first edge of the first major surface 32 and a border 44 of the second panel 47. Those of ordinary skill in the art will appreciate from this disclosure that the first panel and the second panel may be of equal dimensions without departing from the scope of the present invention. Those of ordinary skill in the art will appreciate from this disclosure that the protruding section 47 can be single layer section without departing from the scope of the present invention.

Still referring to FIG. 1, the case system in this embodiment may comprise a portfolio body 30 which is formed from a first panel 32 and a second larger panel. The first panel 32 and the second panel 34 are preferably joined inseparably at the left, right, and bottom edges of the case 30. Preferably there is no connection between the first panel 32 and the second panel 34 at the top edge 44 of the first panel 32. This space between the top of the first panel 32 and the second panel 34 may define a passageway 36 into which a trading card 142 could be inserted. The space between the first panel 32 and the second panel 34 beneath the passageway 36 may define a pocket 46 in which the trading card 142 may be sandwiched between the first major surface 32 and the second major surface 34 for storage. More preferably the trading card 142 is secured in the pocket 46 by being friction fit between the first panel 32 and the second panel 34. The first panel 32 may have an aperture 50 defined thereon through which an autograph may be placed on a trading card 142 stored in the pocket 46. Preferably the second panel 34 extends up past the first edge of the first panel 32 defining a grip portion 48 of the case 30. Preferably this grip portion has texturing on it such that the case system can be more easily transported. More preferably this grip portion 48 is comprised of text embossed on the case system lip 47.

Those of ordinary skill in the art will appreciate from this disclosure that one or both of the first panel 32 and the second panel 34 can be formed of a multi-layered material or a composite material without departing from the scope of the present invention.

Still referring FIG. 1, the aperture 50 is preferably defined by the lack of material on the first major surface 32. The aperture 50 is preferably of a regular shape and large enough to accommodate the application of a signature onto the card 142 contained within the pocket 46, without removing the card 142 from the pocket 46. The aperture 50 is more preferably of a rounded rectangular shape. The aperture 50 is preferably of a width and a height less than that the width and height of the trading card 142 or other sports memorabilia for which the case system is intended.

In a separate aspect the case system preferably comprises a portfolio body 30 with a first major surface 32 and a second major surface 34 forming a pocket 46 configured to contain a trading card 142. Preferably the first major surface 32 and a second major surface 34 do not occlude light. More preferably the first panel 30 and the second panel 34 are clear. Preferably the first panel 32 defines an aperture 50 therethrough. The second panel 34 may underlie the first panel 32 and extend upwardly past the first panel 32 to form a case system lip 47. The protruding section of the second panel 47 preferably is rough. More preferably this roughness is accomplished by embossing to form a textured grip 48. Preferably the first major surface 32 is movable between a first, closed position in which the first panel 32 is configured to overlie the trading card 142 while the trading card 142 is located within the portfolio body 30 and a second, open position in which the case 30 is configured to allow direct access to the trading card 142 located within.

Referring now to FIGS. 8, 9, 14-17, preferably the first major surface 32 has a first connection lip 64 and the second major surface 34 has a second connection lip 66. Preferably when the first major surface 32 is in the first, closed position it is held in place by force. More preferably this force is administered by magnetic fields instituted by first polarity magnets 114 placed along the inside of the first connection lip 66 and magnetic fields instituted by second polarity magnets 116 with the opposite polarity, placed on the inside of the second connection lip 68. More preferably the first polarity magnets 114 and the second polarity magnets 116 are positioned such that when the first major surface 32 is in the first, closed position, magnetic fields of opposite polarity magnets overlap facilitating magnetic attraction between the first major surface 32 and the second major surface 34 which holds the portfolio body 30 in the first, closed position. Those of ordinary skill in the art will appreciate that other mechanisms which can administer sufficient force to keep two objects joined to one another can be used in place of, or alongside, magnets without deviating from the scope of the invention.

Figure 8:
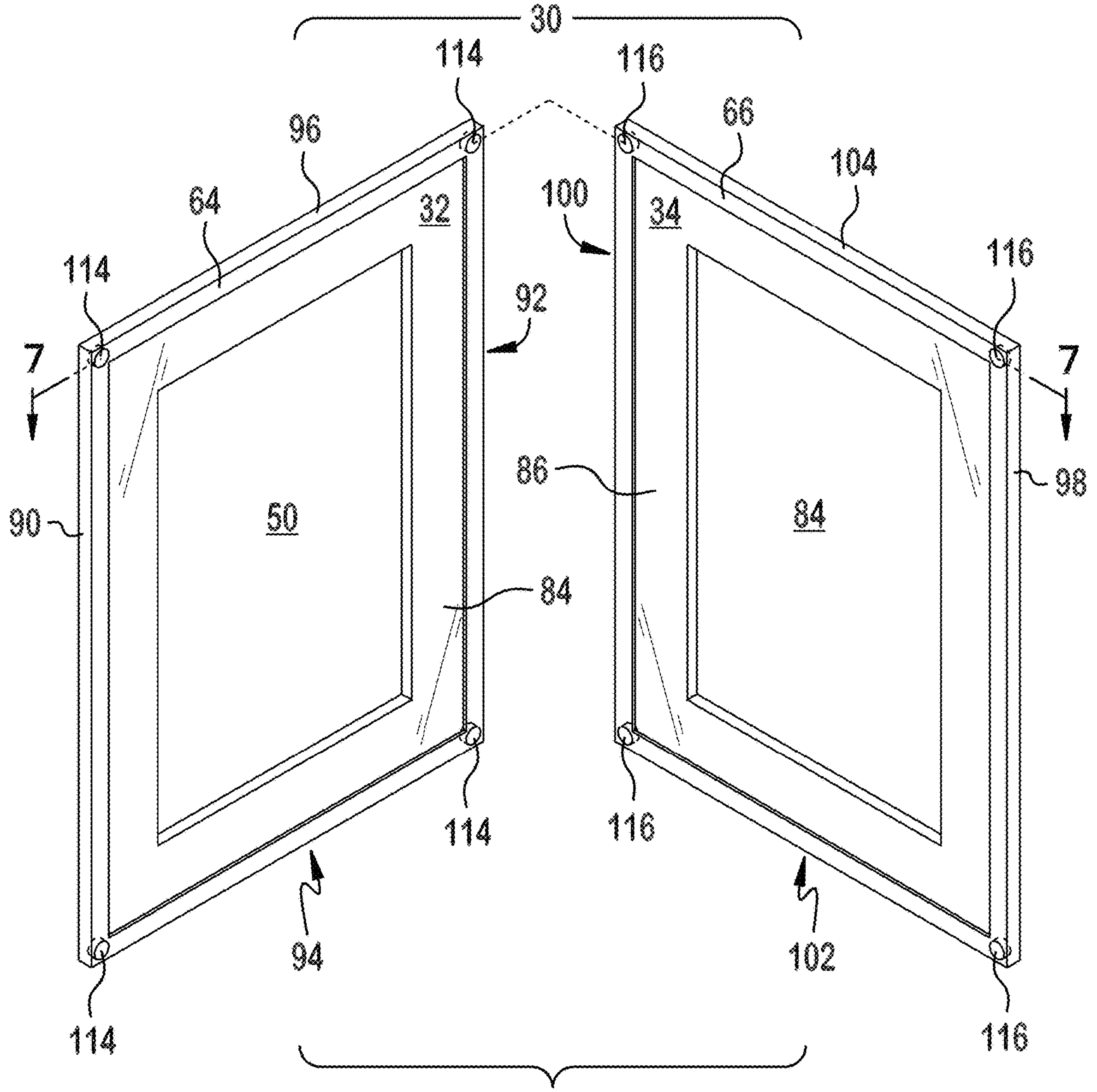
FIG. 8 is an exploded view of an alternative preferred embodiment of the joining mechanism shown in FIG. 5 to form the case 30 shown in FIG. 3.
Figure 9:
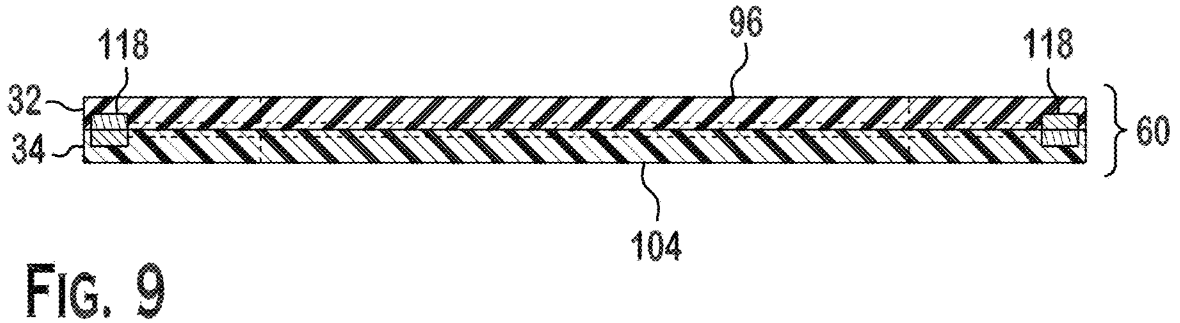
FIG. 9 is a cross-sectional view of the embodiment of the case 30 shown in FIG. 8 as taken along the lines 7-7, illustrating that the first major surface 32 is separably joined to the second major surface 34. When the first major surface 32 is in contact with the second major surface 34 the first polarity magnets 114 may be attracted through magnetic force to the second polarity magnets 116 such that a magnet connection 118 is formed and the first major surface 32 is separably joined to the second major surface 34. When the first major surface 32 is joined to the second major surface 34 the first top minor surface section 96 and the second top minor surface section 104 may collectively form the top minor surface 60.

Referring now to FIGS. 8 and 9, preferably the first major surface 32 has a first connection lip 64 and the second major surface 34 has a second connection lip 66. Preferably when the first connection lip 66 is in contact with the second connection lip 68 the first major surface 32 is held in place against the second major surface 34 by force. More preferably this force is administered by magnetic fields instituted by first polarity magnets 114 placed along the inside of the first connection lip 66 and magnetic fields instituted by second polarity magnets 116 with the opposite polarity, placed on the inside of the second connection lip 68. More preferably the first polarity magnets 114 and the second polarity magnets 116 are positioned such that when the first major surface 32 is placed in close proximity to the second major surface 34, magnetic fields of opposite polarity magnets overlap, facilitating magnetic attraction between the first major surface 32 and the second major surface 34 which holds the first major surface 32 against the second major surface 34. Those of ordinary skill in the art will appreciate that other mechanisms which can administer sufficient force to keep two objects joined to one another can be used in place of or alongside magnets without deviating from the scope of the invention.

Figure 10:
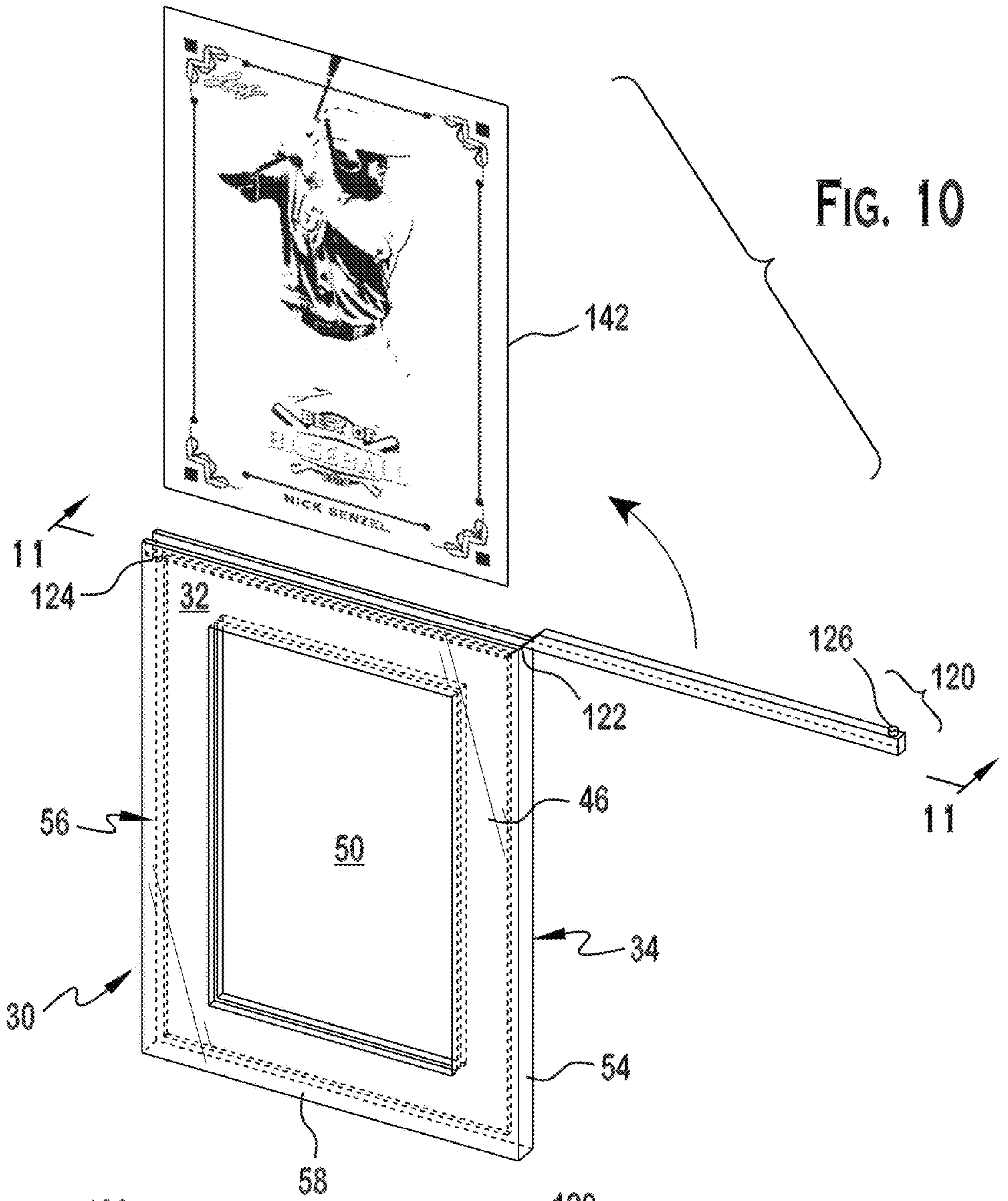
FIG. 10 is a three quarters perspective view of another embodiment of the case 30 of the present invention. The case 30 preferably, but not necessarily, has a first major surface 32 and a second major surface 34. The first major surface 32 and the second major surface 34 preferably are joined on the right side of the case 30 at a right minor surface 54, on the left of the case 30 at a left minor surface 56, and on the bottom of the case 30 at a bottom minor surface 58. Between the top of the first major surface 32 and the top of the second major surface 34 there preferably is a pocket access door 120. The proximal end of the pocket access door 120 may be connected to the top of the right minor surface 54 at a pocket access door hinge 122 such that the distal end of the pocket access door 120 may be rotated radially toward or away from the top of the left minor surface 56 such that the pocket access door 120 may be in a first, closed position or a second, open position.
Figure 11:
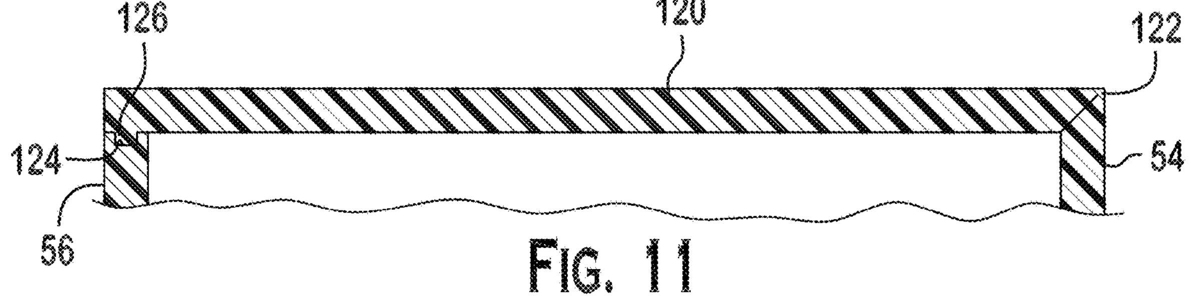
FIG. 11 is a cross-sectional view of the embodiment of the case 30 shown in FIG. 10 as taken along the lines 11-11 with the pocket access door 120 in the first, closed position. When the pocket access door 120 is in the first, closed position the pocket access door pin 126 may separably mesh with the pocket access door latch 124 which may lock the pocket access door 120 in the first, closed position. When the pocket access door pin 126 is meshed with the pocket access door latch 124 it may form a pin latch connection 128. When the pocket access door 120 is in the first, closed position, the passageway 36 may be occluded such that a trading card 142 contained within the pocket 46 cannot be removed.

Referring now to FIGS. 10 and 11, in another embodiment the case system preferably comprises a portfolio body 30 with a first major surface 32 and a second major surface 34 forming a pocket 46 configured to contain a trading card 142. Preferably the first major surface 32 and second major surface 34 do not occlude light. More preferably the first major surface 32 and second major surface 34 are clear. Preferably the first major surface 32 defines an aperture 50 therethrough. Preferably the first major surface 32 is movable between a first, closed position in which the first major surface 32 is configured to overlie the top of the trading card 142 while the trading card 142 is located within the portfolio body 30 and a second, open position in which the case 30 configured to allow access to the trading card 142 located within. The case 30 preferably, but not necessarily, has a first major surface 32 and a second major surface 34. The first major surface 32 and the second major surface 34 preferably are joined on the right side of the case 30 at a right minor surface 54, on the left of the key system 30 at a left minor surface 56, and on the bottom of the case 30 at a bottom minor surface 58. Between the top of the first major surface 32 and the top of the second major surface 34 there preferably is a pocket access door 120 (also referred to herein as a "first panel protruding flange"). The proximal end of the pocket access door 120 may be connected to the top of the right minor surface 54 at a pocket access door hinge 122 such that the distal end of the pocket access door 120 may be rotated radially toward or away from the top of the left minor surface 56 such that the pocket access door 120 may be in a first, closed position or a second, open position. In FIG. 10 the pocket access door 120 is in the second, open position. At the top of the left minor surface 56 there preferably is a pocket access door latch 124. Preferably at the distal end of the pocket access door 120 there is a pocket access door pin 126. When the pocket access door 120 is in the second, open position the space between the top of the first major surface 32 and the top of the second major surface 34 defines a passageway 36. The first major surface 32 and the second major surface 34 define a pocket 46 between them into which a trading card 142 can be placed. The pocket 46 is accessed by sliding the trading card 142 through the passageway 36. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.

Figure 18:
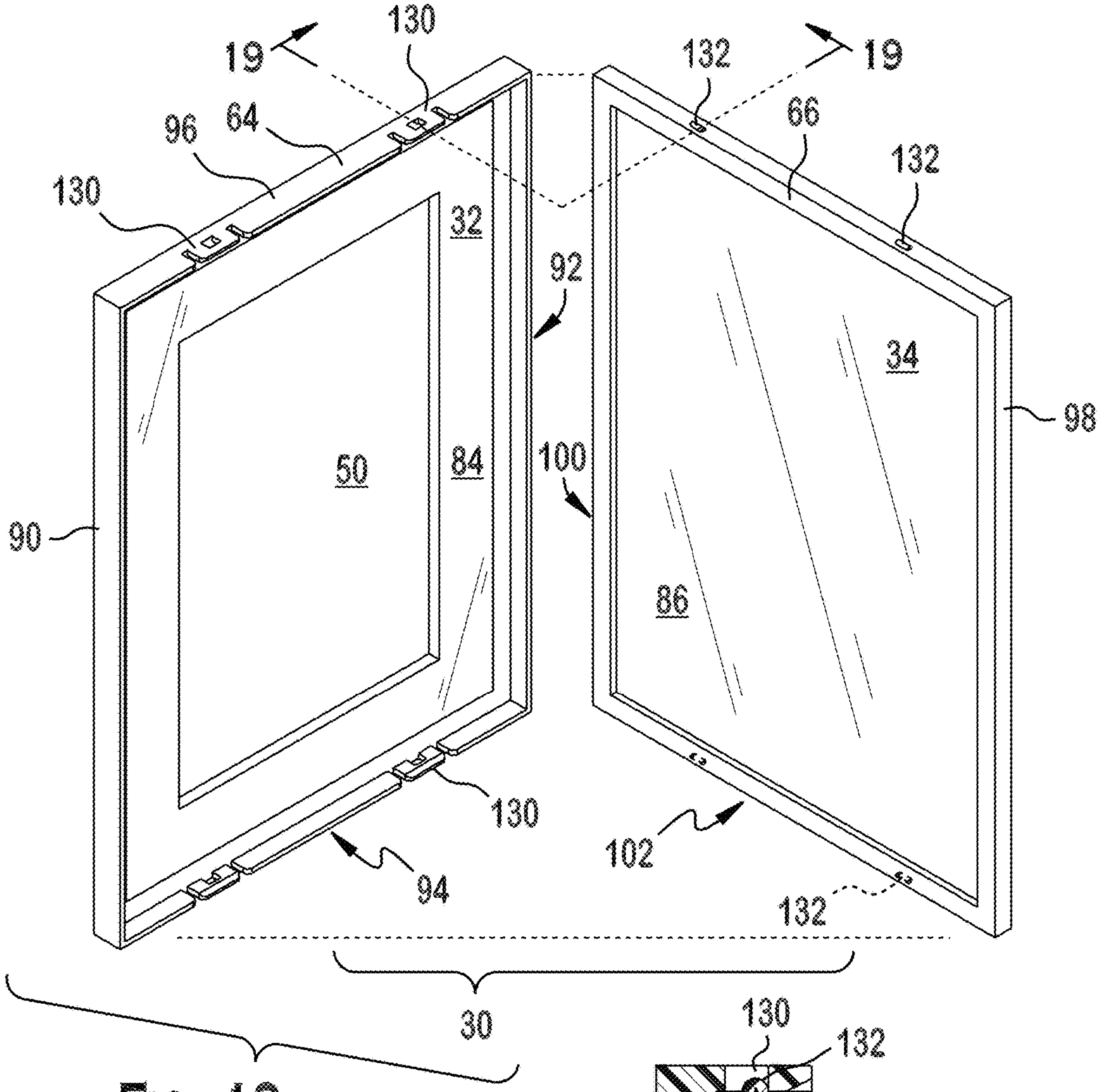
FIG. 18 is a view of the embodiment of the case 30 shown in FIG. 3 such that the first major surface 32 and the second major surface 34 are not joined. In this embodiment of the case 30, preferably the inside of the first major surface 32 has a first connection lip 64 and the inside of the second major surface 34 has a second connection lip 66. The right external edge of the first connection lip 64 may constitute a first right minor surface section 90. The left external edge of the first connection lip 64 may constitute a first left minor surface section 92. The bottom external edge of the first connection lip 64 may constitute a first bottom minor surface section 94. The top external edge of the first connection lip 64 may constitute a first top minor surface section 96. The right external edge of the second connection lip 64 may constitute a second right minor surface section 98. The left external edge of the second connection lip 64 may constitute a second left minor surface section 100. The bottom external edge of the second connection lip 64 may constitute a second bottom minor surface section 102. The top external edge of the second connection lip 64 may constitute a second top minor surface section 104. Preferably both the height and width of the second major surface 34 are slightly smaller than the height and width of the first major surface 32. Preferably the first connection lip 64 is significantly thinner than the second connection lip 66 such that the first connection lip 64 can encompass the second connection lip 66 such that the first right minor surface section 90 overlays the second right minor surface section 98, the first left minor surface section 92 overlays the second left minor surface section 100, the first bottom minor surface section 94 overlays the second bottom minor surface section 102, and the first top minor surface section 96 overlays the second top minor surface section 104. Preferably located on the second top minor surface 104 are one or more male snap joints 132. Preferably located on the second bottom minor surface 102 are one or more male snap joints 132. Preferably located on the first top minor surface 90 are one or more female snap joints 130 configured to receive male snap joints 132. Preferably located on the first bottom minor surface 94 are one or more female snap joints 130 configured to receive male snap joints 132. The space within the bounds of the first connection lip 64 may define a first pocket section 84. The space within the bounds of the second connection lip 66 may define a second pocket section 86. A trading card 142 may be placed in the second pocket section 86 and the first major surface 32 may be separably joined to the second major surface 34 through the application of force between the two. This application of force preferably causes the female snap joints 130 to mesh with the male snap joints 132 by flexing over the male snap joints 132, holding the first major surface 32 to the second major surface 34. When the first major surface 32 is joined to the second major surface 34 the first pocket section 86 and the second pocket section 88 define a pocket 46 wherein the trading card 142 may be stored. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.
Figure 19:
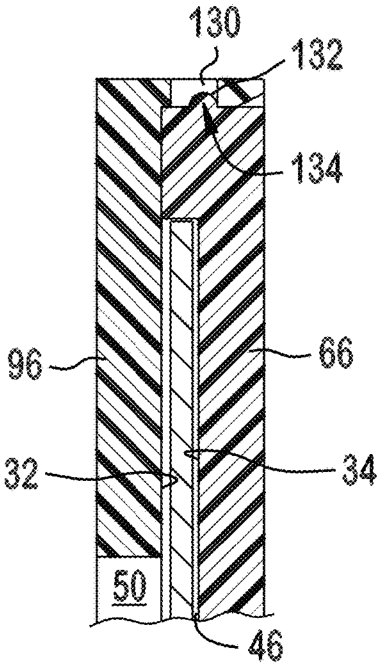
FIG. 19 is a cross-sectional view of the embodiment of the case 30 shown in FIG. 18 as taken along the lines 19-19. When the first major surface 32 is separably joined to the second major surface 34, preferably, the male snap joints 132 on the second connection lip 66 will mesh with the female snap joints 130 on the first connection lip 64 to form snap joint connections 134. The snap joint connections 134 use the compressive force of the female snap joints 130 on the second connection lip 66 to hold the first major surface 32 to the second major surface 34.

Referring now to FIGS. 18 and 19, in another embodiment the case system preferably includes a portfolio body 30 with a first major surface 32 and a second major surface 34. Preferably the inside of the first major surface 32 has a first connection lip 64 and the inside of the second major surface 34 has a second connection lip 66. The right external edge of the first connection lip 64 may constitute a first right minor surface section 90. The left external edge of the first connection lip 64 may constitute a first left minor surface section 92. The bottom external edge of the first connection lip 64 may constitute a first bottom minor surface section 94. The top external edge of the first connection lip 64 may constitute a first top minor surface section 96. The right external edge of the second connection lip 64 may constitute a second right minor surface section 98. The left external edge of the second connection lip 64 may constitute a second left minor surface section 100. The bottom external edge of the second connection lip 64 may constitute a second bottom minor surface section 102. The top external edge of the second connection lip 64 may constitute a second top minor surface section 104. Preferably both the height and width of the second major surface 34 are slightly smaller than the height and width of the first major surface 32. Preferably the first connection lip 64 is significantly thinner than the second connection lip 66 such that the first connection lip 64 can encompass the second connection lip 66 such that the first right minor surface section 90 overlays the second right minor surface section 98, the first left minor surface section 92 overlays the second left minor surface section 100, the first bottom minor surface section 94 overlays the second bottom minor surface section 102, and the first top minor surface section 96 overlays the second top minor surface section 104. Preferably located on the second top minor surface 104 are one or more male snap joints 132. Preferably located on the second bottom minor surface 102 are one or more male snap joints 132. Preferably located on the first top minor surface 90 are one or more female snap joints 130 configured to receive male snap joints 132. Preferably located on the first bottom minor surface 94 are one or more female snap joints 130 configured to receive male snap joints 132. The space within the bounds of the first connection lip 64 may define a first pocket section 84. The space within the bounds of the second connection lip 66 may define a second pocket section 86. The trading card 142 may be placed in the second pocket section 86 and the first major surface 32 may be separably joined to the second major surface 34 through the application of force between the two. This application of force preferably causes the female snap joints 130 to mesh with the male snap joints 132 by flexing over the male snap joints 132, holding the first major surface 32 to the second major surface 34. When the first major surface 32 is joined to the second major surface 34 the first pocket section 86 and the second pocket section 88 define a pocket 46 wherein the trading card 142 may be stored. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing. Referring to FIG. 19, when the first major surface 32 is separably joined to the second major surface 34 it is preferably that the male snap joints 132 on the second connection lip 66 will mesh with the female snap joints 130 on the first connection lip 64 to form snap joint connections 134. The snap joint connections 134 preferably use the compressive force of the female snap joints 130 on the second connection lip 66 to hold the first major surface 32 to the second major surface 34.

Figure 12:
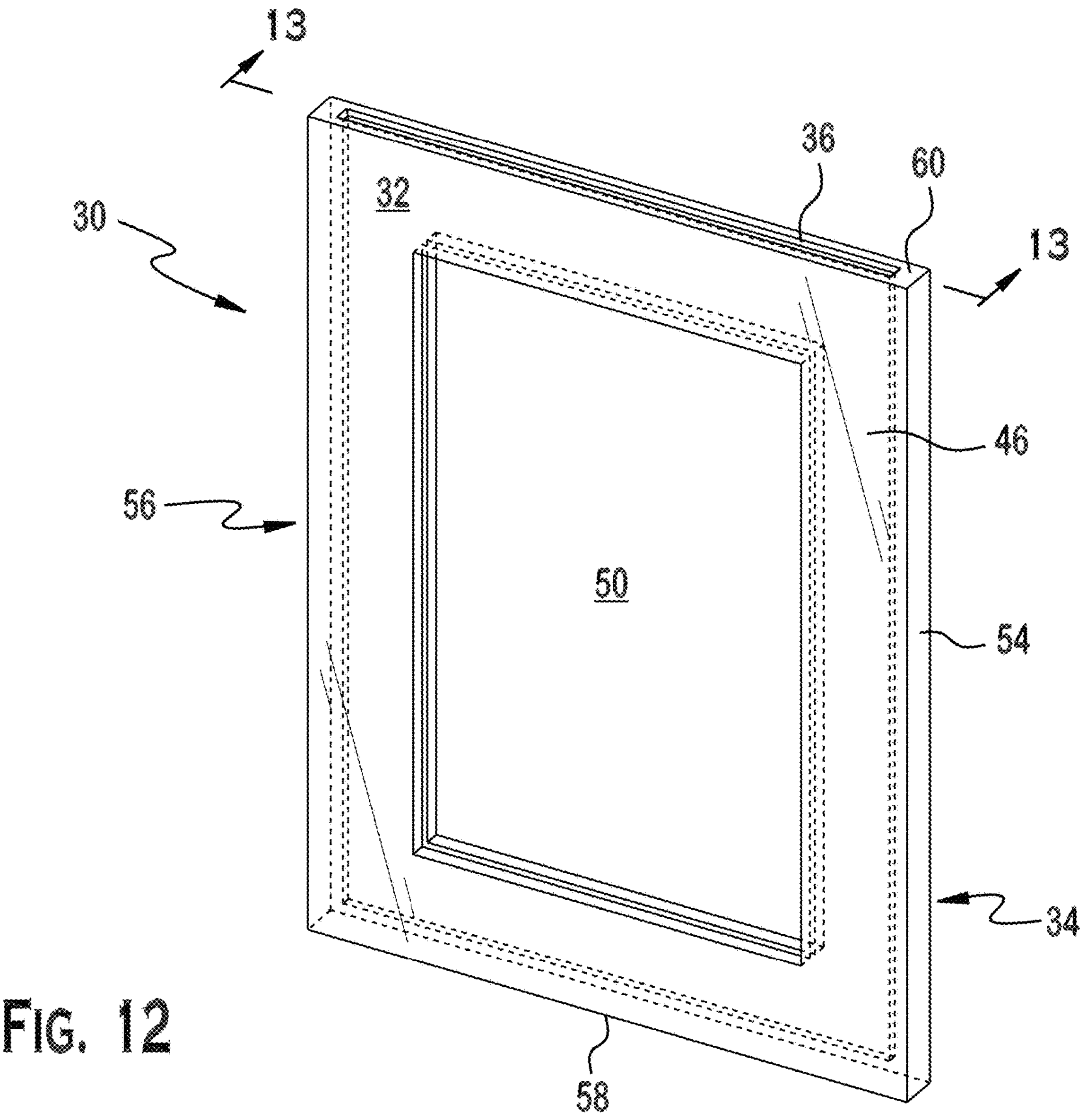
FIG. 12 is a three quarters perspective view of another preferred embodiment of the case 30 of the present invention. The case 30 preferably, but not necessarily, has a first major surface 32 and a second major surface 34. The first major surface 32 and the second major surface 34 preferably are joined on the right side of the case 30 at a right minor surface 54, on the left of the case 30 at a left minor surface 56, on the bottom of the case 30 at a bottom minor surface 58, and on the top of the case 30 at a top minor surface 60. The center of the top minor surface 60 may define a passageway 36. The first major surface 32 and the second major surface 34 may define a pocket 46 between them into which a trading card 142 can be placed. The pocket 46 is accessed by sliding the trading card 142 through the passageway 36. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.
Figure 13:
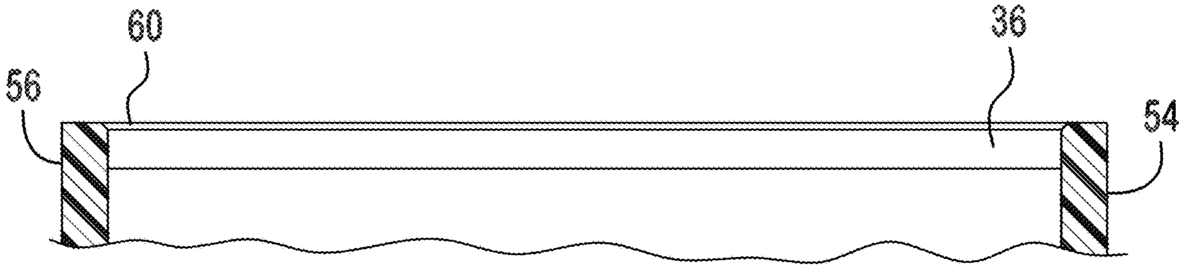
FIG. 13 is cross-sectional view of the embodiment of the case 30 shown in FIG. 12 as taken along the lines 13-13.
Figure 14:
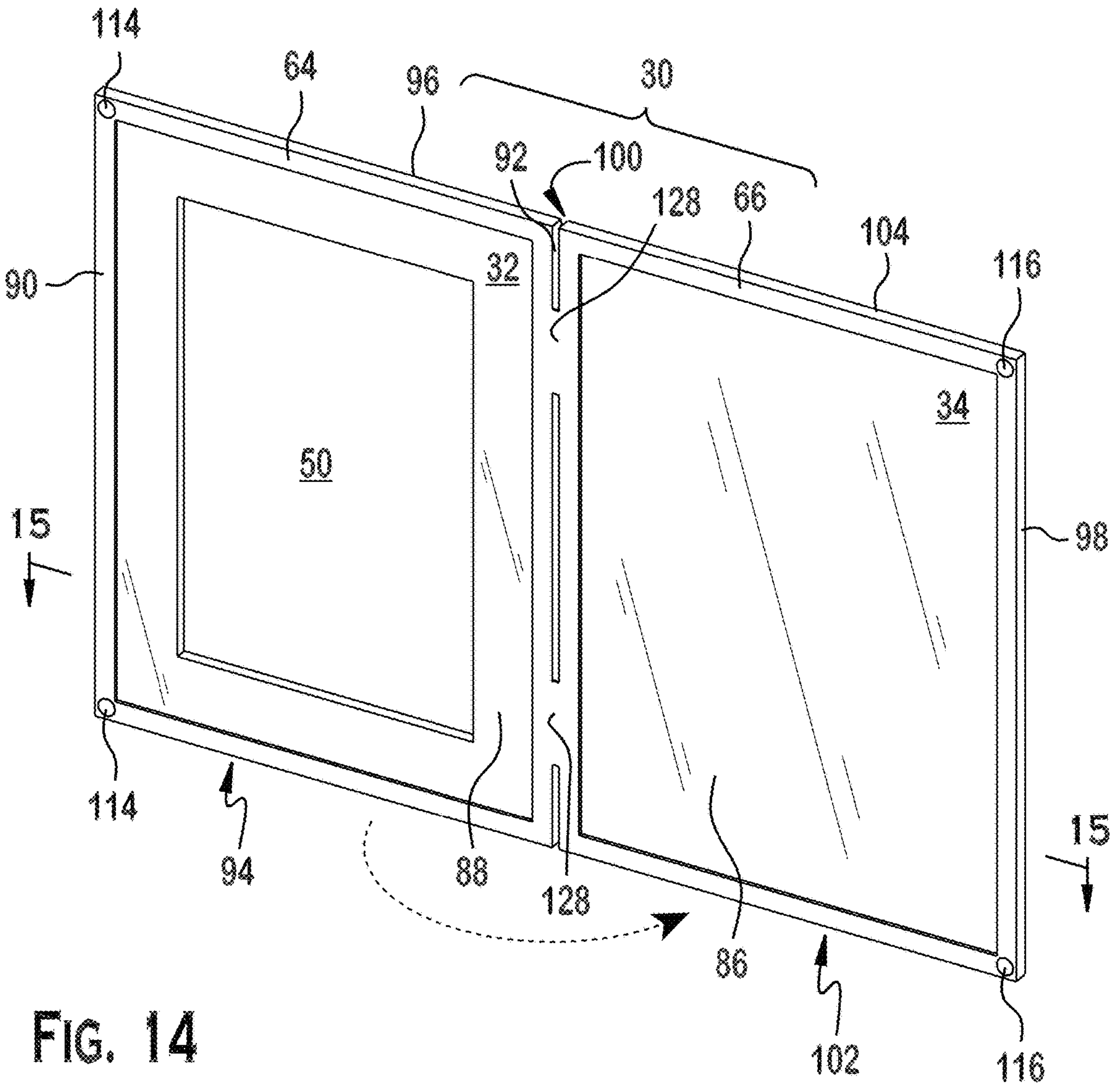
FIG. 14 is a three quarters perspective view of another preferred embodiment of the case 30 of the present invention. The case 30 preferably, but not necessarily, has a first major surface 32 and a second major surface 34. The first major surface 32 preferably has a first connection lip 64 at its perimeter, while the second major surface 34 preferably has a second connection lip 66 at its perimeter. The right external face of the first connection lip 64 preferably has a first right minor surface section 90, the left external face of the first connection lip 64 preferably has a first left minor surface section 92, the bottom external face of the first connection lip 64 preferably has a first bottom minor surface section 96, and the top external face of the first connection lip 64 preferably has a first top minor surface section 96. The right external face of the second connection lip 66 preferably has a second right minor surface section 98, the left external face of the second connection lip 66 preferably has a second left minor surface section 100, the bottom external face of the second connection lip 66 preferably has a second bottom minor surface section 102, and the top external face of the second connection lip 66 preferably has a second top minor surface section 104. The first major surface 32 is preferably joined to the second major surface 34 by a hinge 128 on the first left minor surface section 92 and the second left minor surface section 100. The case 30 may be movable from a second, open position shown in FIG. 14 to a first, closed position shown in FIG. 15 by rotating the first major surface 32 about the hinge 128 such that the first connection lip 64 comes into contact with the second connection lip 66. The two distal corners of the first connection lip 64 may each have a first polarity magnet 114. The two distal corners of the second connection lip 66 may each have a second polarity magnet 116. Preferably the first polarity magnets 114 have the same polarity. Preferably the second polarity magnets 116 have opposite polarities to those of the first polarity magnets 114 such that the first polarity magnets 114 are attracted magnetically to the second polarity magnets 116. The free space within the planar bounds of the first connection lip 64 may define a first pocket section 84. The free space within the planar bounds of the bounds of the second connection lip 66 may define a second pocket section 86. A trading card 142 may be placed in the second pocket section 86 and the first major surface 32 may be separably joined to the second major surface 34 by moving the case 30 from the second, open position to the first, closed position. Preferably moving the case 30 from the second, open position to the first, closed position brings the first major surface 32 within the proximity of the second major surface 34 such that the magnetic fields of the first polarity magnets 114 overlap with the magnetic fields of the second polarity magnets 116. When the magnetic fields of the first polarity magnets 114 overlap with the magnetic fields of the second polarity magnets 116, magnetic attractive forces may separably hold the first major surface 32 to the second major surface 34. When the first major surface 32 is joined to the second major surface 34 the first pocket section 86 and the second pocket section 88 may define a pocket 46 wherein the trading card 142 may be stored. The center of the first major surface 32 may define a front aperture 50 which provides direct access to a trading card 142 stored in the pocket 46 for autographing.
Figure 15:
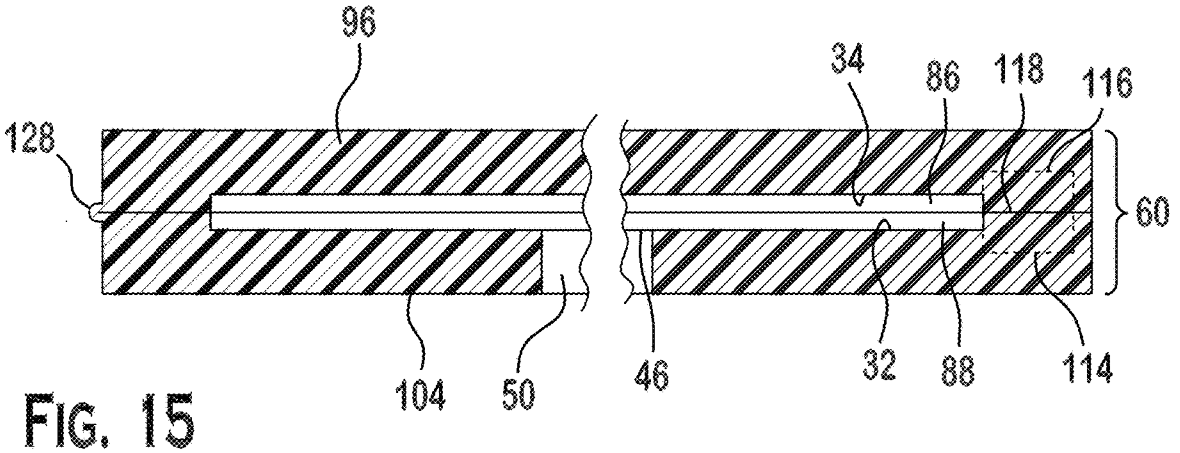
FIG. 15 is a cross-sectional view of the embodiment of the case 30 shown in FIG. 14 as taken along the lines 15-15, wherein the first major surface 32 is separably joined to the second major surface 34. When the case is in the first, closed position the first major surface 32 is preferably in contact with the second major surface 34 and the first polarity magnets 114 may be attracted through magnetic force to the second polarity magnets 116 such that a magnet connection 118 is formed and the first major surface 32 is separably joined to the second major surface 34. When the case 307 is in the first, closed position the first major surface 32 may be joined to the second major surface 34 and the first top minor surface section 96 and the second top minor surface section 104 may collectively form the top minor surface 60.
Figure 16:
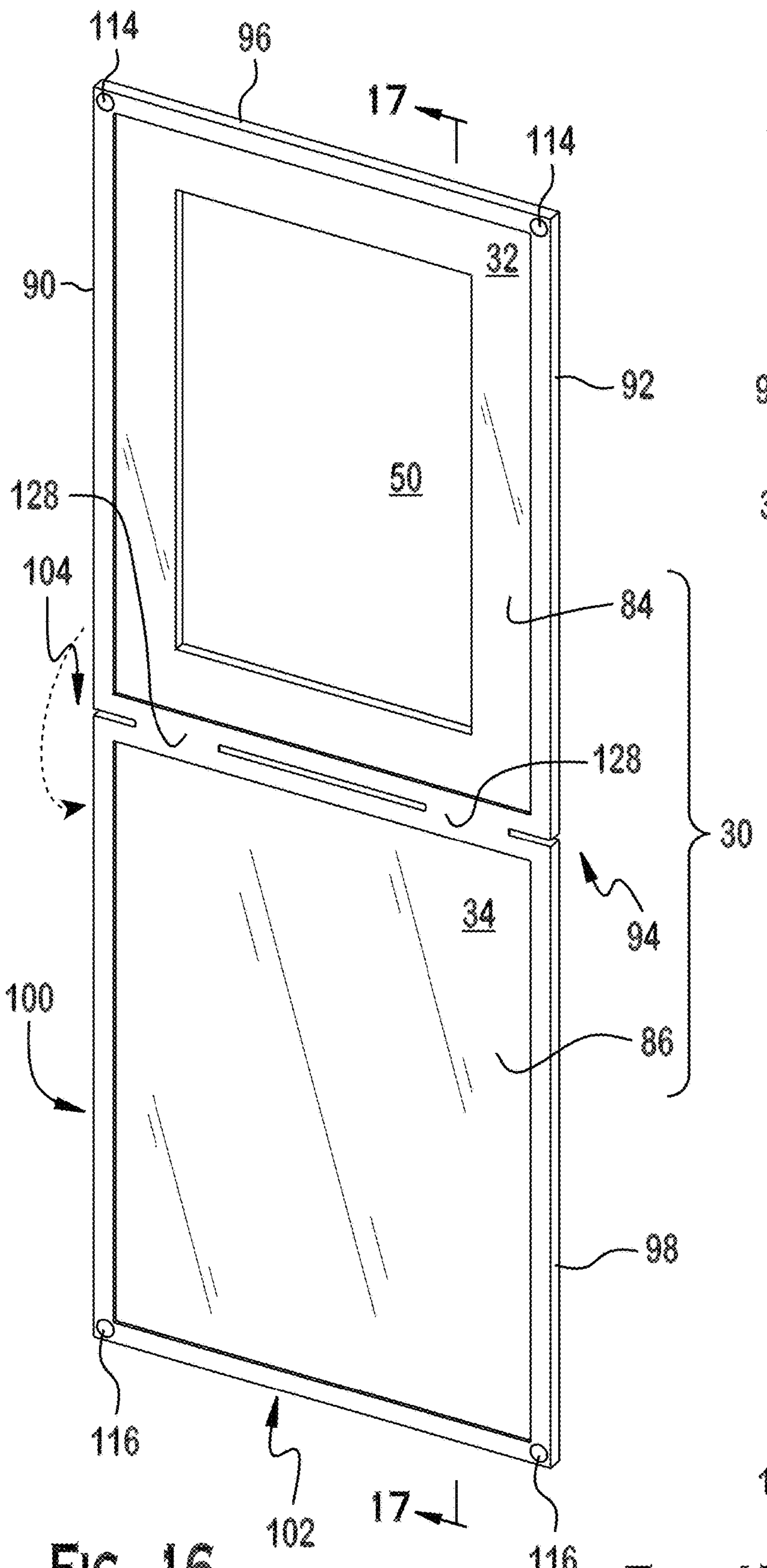
FIG. 16 is a three quarters perspective view of another preferred embodiment of the case 30 of the present invention. The case 30 preferably, but not necessarily, has a first major surface 32 and a second major surface 34. The first major surface 32 preferably has a first connection lip 64 at its perimeter, while the second major surface 34 preferably has a second connection lip 66 at its perimeter. The right external face of the first connection lip 64 preferably has a first right minor surface section 90, the left external face of the first connection lip 64 preferably has a first left minor surface section 92, the bottom external face of the first connection lip 64 preferably has a first bottom minor surface section 96, and the top external face of the first connection lip 64 preferably has a first top minor surface section 96. The right external face of the second connection lip 66 preferably has a second right minor surface section 98, the left external face of the second connection lip 66 preferably has a second left minor surface section 100, the bottom external face of the second connection lip 66 preferably has a second bottom minor surface section 102, and the top external face of the second connection lip 66 preferably has a second top minor surface section 104. The first major surface 32 is preferably joined to the second major surface 34 by a hinge 128 on the first bottom surface section 94 and the second top minor surface section 104. The case 30 may be movable from a second, open position to a first, closed position by rotating the first major surface 32 about the hinge 128 such that the first connection lip 64 comes into contact with the second connection lip 66. The two distal corners of the first connection lip 64 may each have a first polarity magnet 114. The two distal corners of the second connection lip 66 may each have a second polarity magnet 116. Preferably the first polarity magnets 114 have the same polarity. Preferably the second polarity magnets 116 have opposite polarities to those of the first polarity magnets 114 such that the first polarity magnets 114 are attracted magnetically to the second polarity magnets 116. The free space within the planar bounds of the first connection lip 64 may define a first pocket section 84. The free space within the planar bounds of the bounds of the second connection lip 66 may define a second pocket section 86. A trading card 142 may be placed in the second pocket section 86 and the first major surface 32 may be separably joined to the second major surface 34 by moving the case 30 from the second, open position to the first, closed position. Preferably moving the case 30 from the second, open position to the first, closed position brings the first major surface 32 within a proximity of the second major surface 34 such that the magnetic fields of the first polarity magnets 114 overlap with the magnetic fields of the second polarity magnets 116. When the magnetic fields of the first polarity magnets 114 overlap with the magnetic fields of the second polarity magnets 116, magnetic attractive forces may separably hold the first major surface 32 to the second major surface 34. When the first major surface 32 is joined to the second major surface 34 the first pocket section 86 and the second pocket section 88 may define a pocket 46 wherein the trading card 142 may be stored. The center of the first major surface 32 may define a front aperture 50 which provides direct access to a trading card 142 stored in the pocket 46 for autographing.
Figure 17:
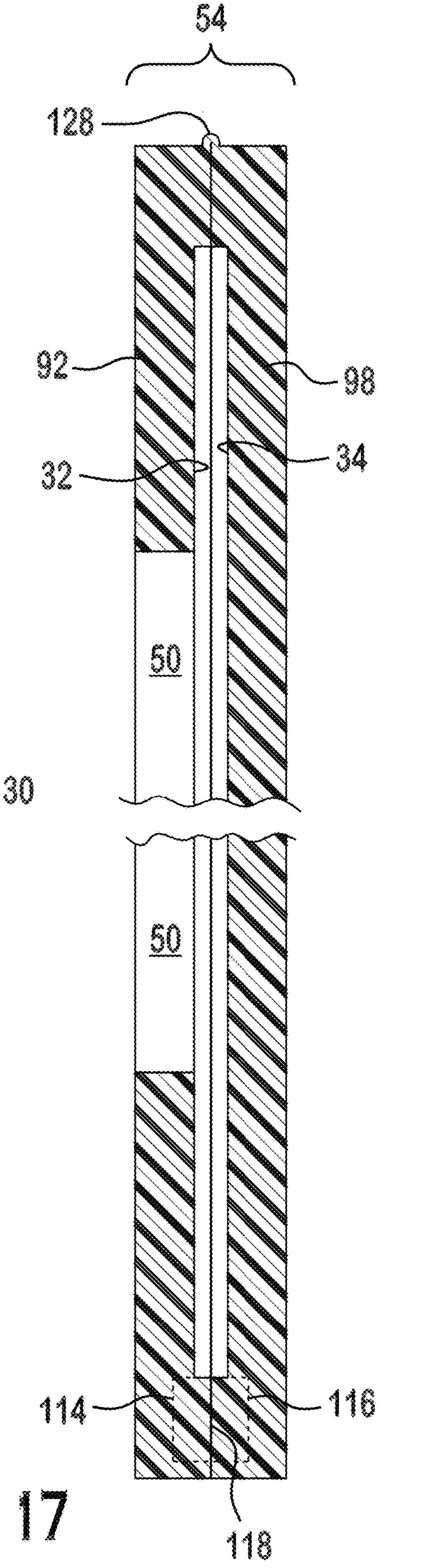
FIG. 17 is a cross-sectional view of the embodiment of the case 30 shown in FIG. 14 as taken along the lines 17-17, wherein the first major surface 32 is separably joined the second major surface 34. When the case is in the first, closed position the first major surface 32 is preferably in contact with the second major surface 34 and the first polarity magnets 114 may be attracted through magnetic force to the second polarity magnets 116 such that a magnet connection 118 is formed and the first major surface 32 is separably joined to the second major surface 34. When the case 30 is in the first, closed position the first major surface 32 may be joined to the second major surface 34 and the first right minor surface section 90 and the second right minor surface section 98 may collectively form the right minor surface 54.

Referring now to FIGS. 12 and 13, in another embodiment the case system preferably comprises a portfolio body 30 with a first major surface 32 and a second major surface 34. The first major surface 32 and the second major surface 34 preferably are joined on the right side of the case 30 at a right minor surface 54, on the left of the case 30 at a left minor surface 56, on the bottom of the case 30 at a bottom minor surface 58, and on the top of the case 30 at a top minor surface 60. The center of the top minor surface 60 may define a passageway 36. The first major surface 32 and the second major surface 34 may define a pocket 46 between them into which a trading card 142 can be placed. The pocket 46 is accessed by sliding the trading card 142 through the passageway 36. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.

In another embodiment, the present invention includes a first panel 32 having a first panel frontal portion which forms at least a partial frame around a subpanel (similar in concept to a flexible dog door used in an exterior door). Preferably, to move the first panel 32 into the second, open position the subpanel is rotated/folded/bent away from the second panel 34 to provide access to the aperture 50.

Figure 3:
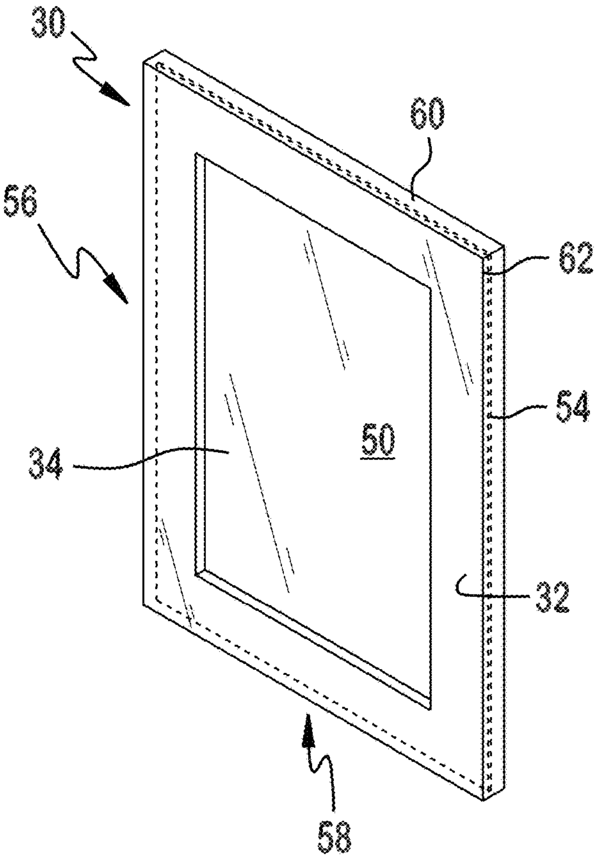
FIG. 3 is a three quarters perspective view of another preferred embodiment of the case system of the present invention. The case 30 preferably, but not necessarily, has a first major surface 32 and a second major surface 34. The first major surface 32 and the second major surface 34 preferably are joined on the right side of the case 30 at a right minor surface 54, on the left of the case 30 at a left minor surface 56, on the bottom of the case 30 at a bottom minor surface 58, and at the top of the case 30 at a top minor surface 60. The first major surface 32 and the second major surface 34 define a pocket 46 between them into which a trading card 142 can be placed. The pocket 46 is accessed by separating the first major surface 32 from the second major surface 34. The first major surface 32 and the second major surface 34 are separably joined along a dividing line 62 that bisects each of: the right minor surface 54, the left minor surface 56, the bottom minor surface 58, and the top minor surface 60. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.
Figure 4:
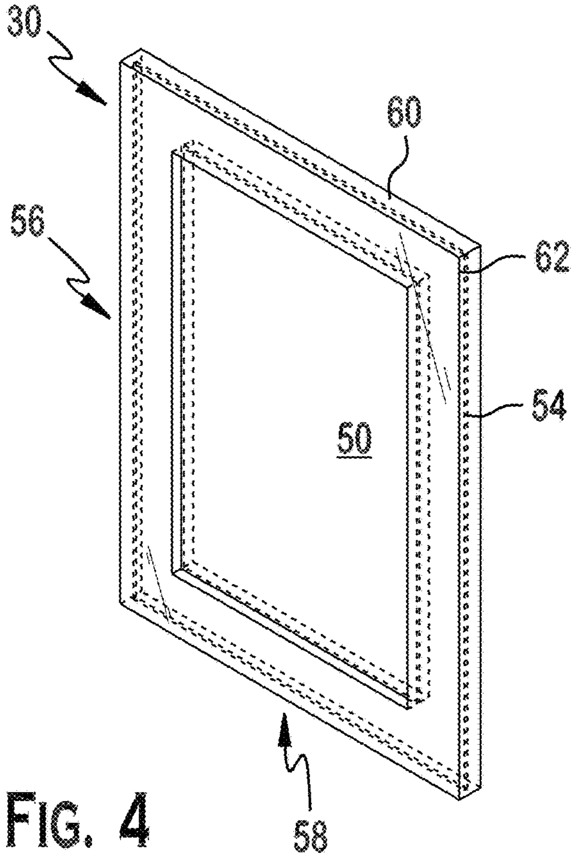
FIG. 4 is a three quarters perspective, internal structure view of the embodiment of the case 30 shown in FIG. 3.
Figure 5:
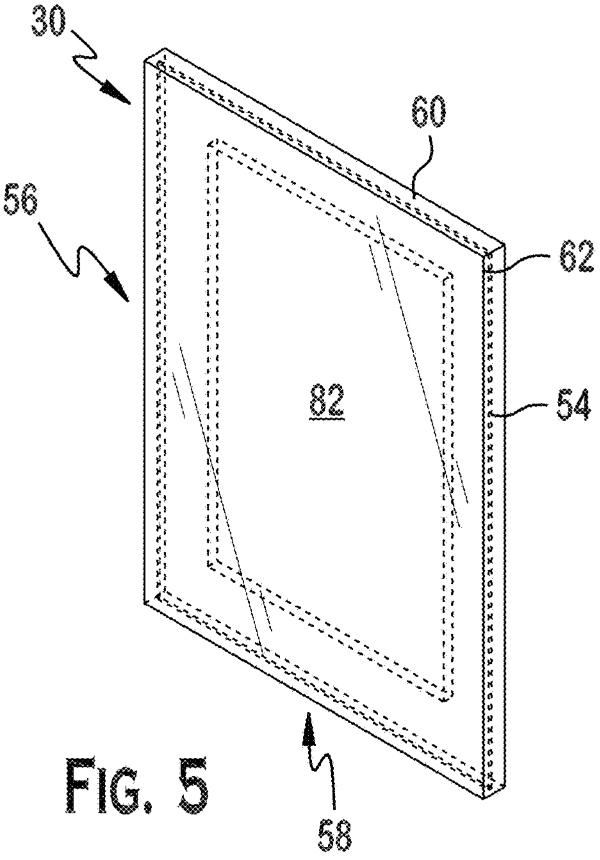
FIG. 5 is another three quarters perspective, internal structure view of the embodiment of the case 30 shown in FIG. 3 such that the rear aperture 84 is visible.

Referring now to FIG. 3, another preferred embodiment of the case 30 preferably, but not necessarily, has a first major surface 32 and a second major surface 34. The first major surface 32 and the second major surface 34 preferably are joined on the right side of the case 30 at a right minor surface 54, on the left of the case 30 at a left minor surface 56, on the bottom of the case 30 at a bottom minor surface 58, and at the top of the case 30 at a top minor surface 60. The first major surface 32 and the second major surface 34 define a pocket 46 between them into which a trading card 142 can be placed. The pocket 46 is accessed by separating the first major surface 32 from the second major surface 34. The first major surface 32 and the second major surface 34 are separably joined along a dividing line 62 that bisects each of: the right minor surface 54, the left minor surface 56, the bottom minor surface 58, and the top minor surface 60. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing. FIG. 4 illustrates an internal structural view of the case 30. Referring to FIG. 5, a rear aperture 84 of the case 30 is exclusively visible.

Figure 6:
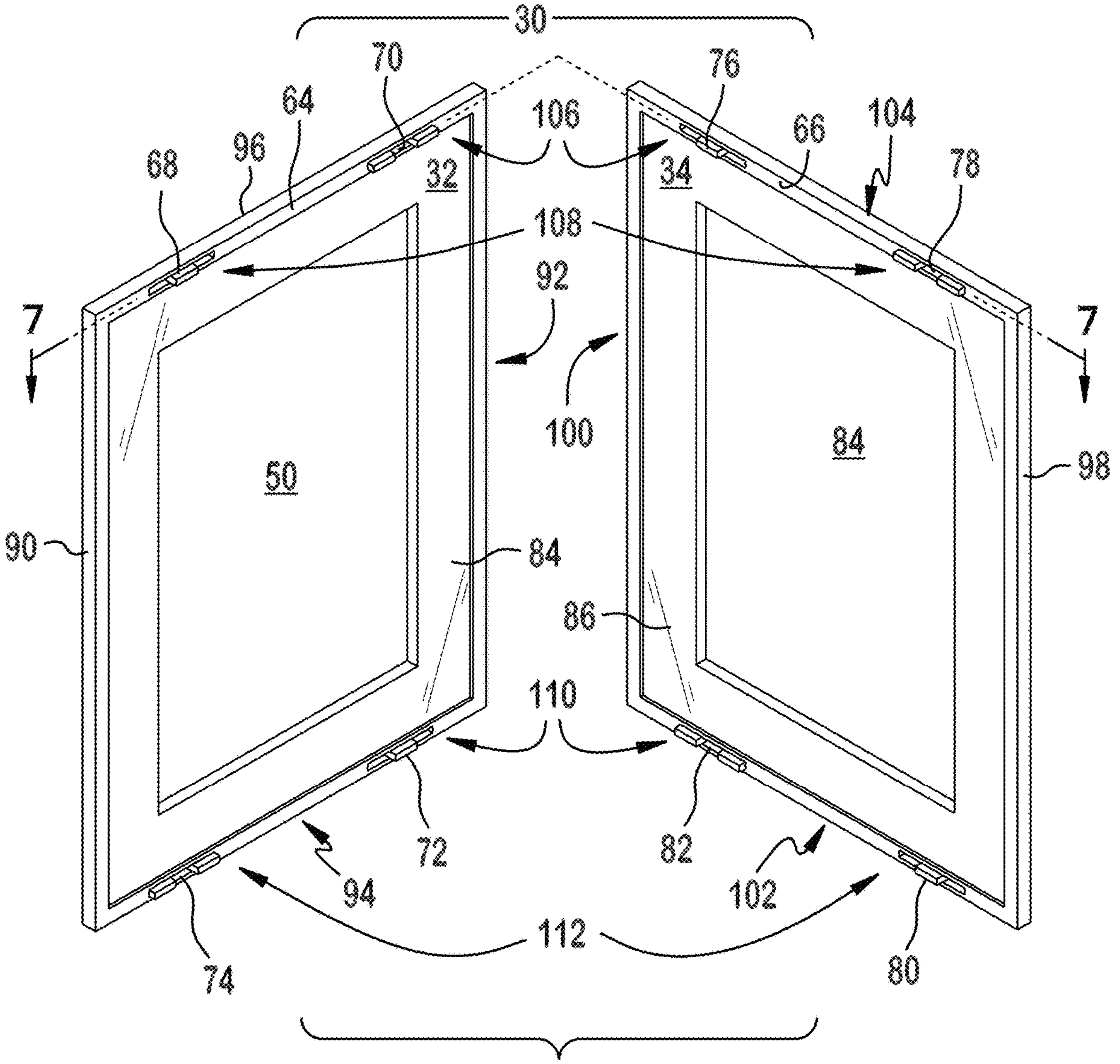
FIG. 6 is an exploded view of the embodiment of the case 30 of FIG. 3 such that the first major surface 32 and the second major surface 34 are not joined. In this embodiment of the case 30, preferably the inside of the first major surface 32 has a first connection lip 64 and the inside of the second major surface 34 has a second connection lip 66. Preferably located on the top of the first connection lip 64 is a first top tongue joint 68 and a first top groove joint 70. Preferably located on the bottom of the first connection lip 66 is a first bottom tongue joint 72 and a first bottom groove joint 74. Preferably located on the top of the second connection lip 66 is a second top tongue joint 76 and a second top groove joint 78. Preferably located in the bottom of the second connection lip 66 is a second bottom tongue joint 80 and a second bottom groove joint 82. The right external edge of the first connection lip 64 may constitute a first right minor surface section 90. The left external edge of the first connection lip 64 may constitute a first left minor surface section 92. The bottom external edge of the first connection lip 64 may constitute a first bottom minor surface section 94. The top external edge of the first connection lip 64 may constitute a first top minor surface section 96. The right external edge of the second connection lip 64 may constitute a second right minor surface section 98. The left external edge of the second connection lip 64 may constitute a second left minor surface section 100. The bottom external edge of the second connection lip 64 may constitute a second bottom minor surface section 102. The top external edge of the second connection lip 64 may constitute a second top minor surface section 104. The space within the bounds of the first connection lip 64 may define a first pocket section 84. The space within the bounds of the second connection lip 66 may define a second pocket section 86. A trading card 142 may be placed into the second pocket section 86 and the first major surface 32 may be separably joined to the second major surface 34 through the application of force between the two. This application of force preferably causes the first top tongue joint 68 to mesh with the second top groove joint 76, the first top groove joint 70 to mesh with the second top tongue joint 78, the first bottom tongue joint 72 to mesh with the second bottom groove joint 82, and the first bottom groove joint 74 to mesh with the second bottom tongue joint 80. When the first major surface 32 is joined to the second major surface 34 the first pocket section 86 and the second pocket section 88 define a pocket 46 wherein the trading card 142 may be stored. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing.
Figure 7:
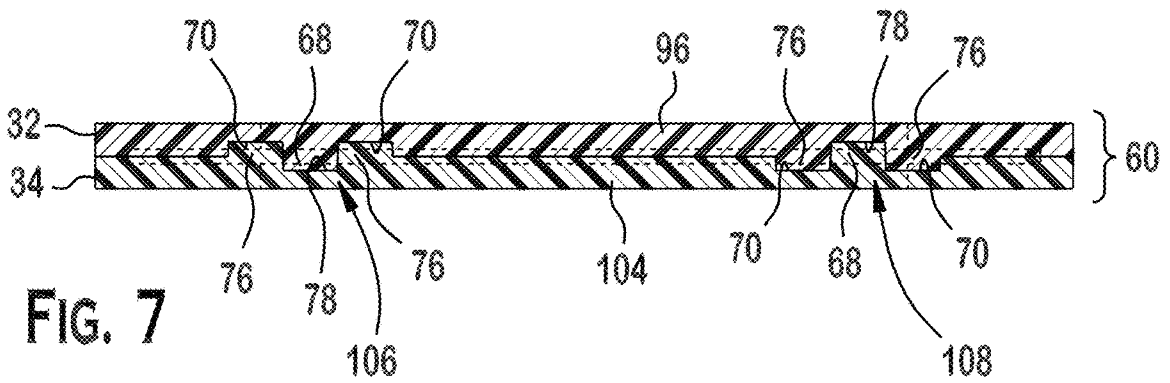
FIG. 7 is a cross-sectional view of the embodiment of FIG. 3 as taken along the lines 7-7 illustrating that the first major surface 32 can be separably joined to the second major surface 34. When the first top tongue joint 76 is meshed with the second top groove joint 78 a primary tongue and groove connection 106 may be made which holds the first major surface 32 to the second major surface 34 through the force of friction. When the first major surface 32 is joined to the second major surface 34 the first top minor surface section 96 and the second top minor surface section 104 may collectively form the top minor surface 60.

Referring to FIGS. 6 and 7, another embodiment of the case 30 shows that the first major surface 32 and the second major surface 34 may not be joined. In this embodiment of the case 30, preferably the inside of the first major surface 32 has a first connection lip 64 and the inside of the second major surface 34 has a second connection lip 66. Preferably located on the top of the first connection lip 64 is a first top tongue joint 68 and a first top groove joint 70. Preferably located on the bottom of the first connection lip 66 is a first bottom tongue joint 72 and a first bottom groove joint 74. Preferably located on the top of the second connection lip 66 is a second top tongue joint 76 and a second top groove joint 78. Preferably located on the bottom of the second connection lip 66 is a second bottom tongue joint 80 and a second bottom groove joint 82. The right external edge of the first connection lip 64 may constitute a first right minor surface section 90. The left external edge of the first connection lip 64 may constitute a first left minor surface section 92. The bottom external edge of the first connection lip 64 may constitute a first bottom minor surface section 94. The top external edge of the first connection lip 64 may constitute a first top minor surface section 96. The right external edge of the second connection lip 64 may constitute a second right minor surface section 98. The left external edge of the second connection lip 64 may constitute a second left minor surface section 100. The bottom external edge of the second connection lip 64 may constitute a second bottom minor surface section 102. The top external edge of the second connection lip 64 may constitute a second top minor surface section 104. The space within the bounds of the first connection lip 64 may define a first pocket section 84. The space within the bounds of the second connection lip 66 may define a second pocket section 86. A trading card 142 may be placed into the second pocket section 86 and the first major surface 32 may be separably joined to the second major surface 34 through the application of force between the two. This application of force preferably causes the first top tongue joint 68 to mesh with the second top groove joint 76, the first top groove joint 70 to mesh with the second top tongue joint 78, the first bottom tongue joint 72 to mesh with the second bottom groove joint 82, and the first bottom groove joint 74 to mesh with the second bottom tongue joint 80. When the first major surface 32 is joined to the second major surface 34 the first pocket section 86 and the second pocket section 88 define a pocket 46 wherein the trading card 142 may be stored. The center of the first major surface 32 may define a front aperture 50 which provides direct access to a trading card 142 stored in the pocket 46 for autographing. The center of the second major surface 34 may define a rear aperture 84 which provides direct access to the back of a trading card 142 stored in the pocket 46 for autographing. The first major surface 32 can be separably joined to the second major surface 34. When the first top tongue joint 68 is meshed with the second top groove joint 78 a primary tongue and groove connection 106 may be made which holds the first major surface 32 to the second major surface 34 through the force of friction. When the first major surface 32 is joined to the second major surface 34 the first top minor surface section 96 and the second top minor surface section 104 may collectively form the top minor surface 60. Although a preferred construction is disclosed above, those of ordinary skill in the art will appreciate from this disclosure that the structure of the case system in which the first panel 32 and the second panel 34 are separably joined can be varied without departing from the scope of the present invention.

Preferably the first panel 32 and the second panel 34 of the case system are not completely opaque. More preferably the first panel 32 and the second panel 34 of the case system are completely see-through. Alternatively, one or both of the first panel 32 and the second panel 34 may be opaque without departing from the scope of the present invention. The portfolio body 30 of the case system preferably does not occlude light from passing through it thereby rendering a card 142 contained within the pocket 46 visible while it is stored in the case 30.

Referring now to FIGS. 3-5, 6, 8, 10, and 12, the case system can have more than one aperture 50. For example, the case 30 can have a first aperture 50 defined by the first panel 32 thereby providing access to the front of the card 142 stored in the pocket 46 for signing and the case 30 can also have a second aperture 84 (herein also referred to as a "rear aperture") defined by the second panel 34 thereby providing access to the rear of a card 142 stored in the pocket 46 for signing. Preferably the front aperture 50 is defined by a void of material in the first panel 32. Preferably the rear aperture 84 is defined by a void of material in a portion of the second panel 34. Preferably, but not necessarily, the rear aperture 84 is of a similar shape and size as that of the front aperture 50.

Figure 20:
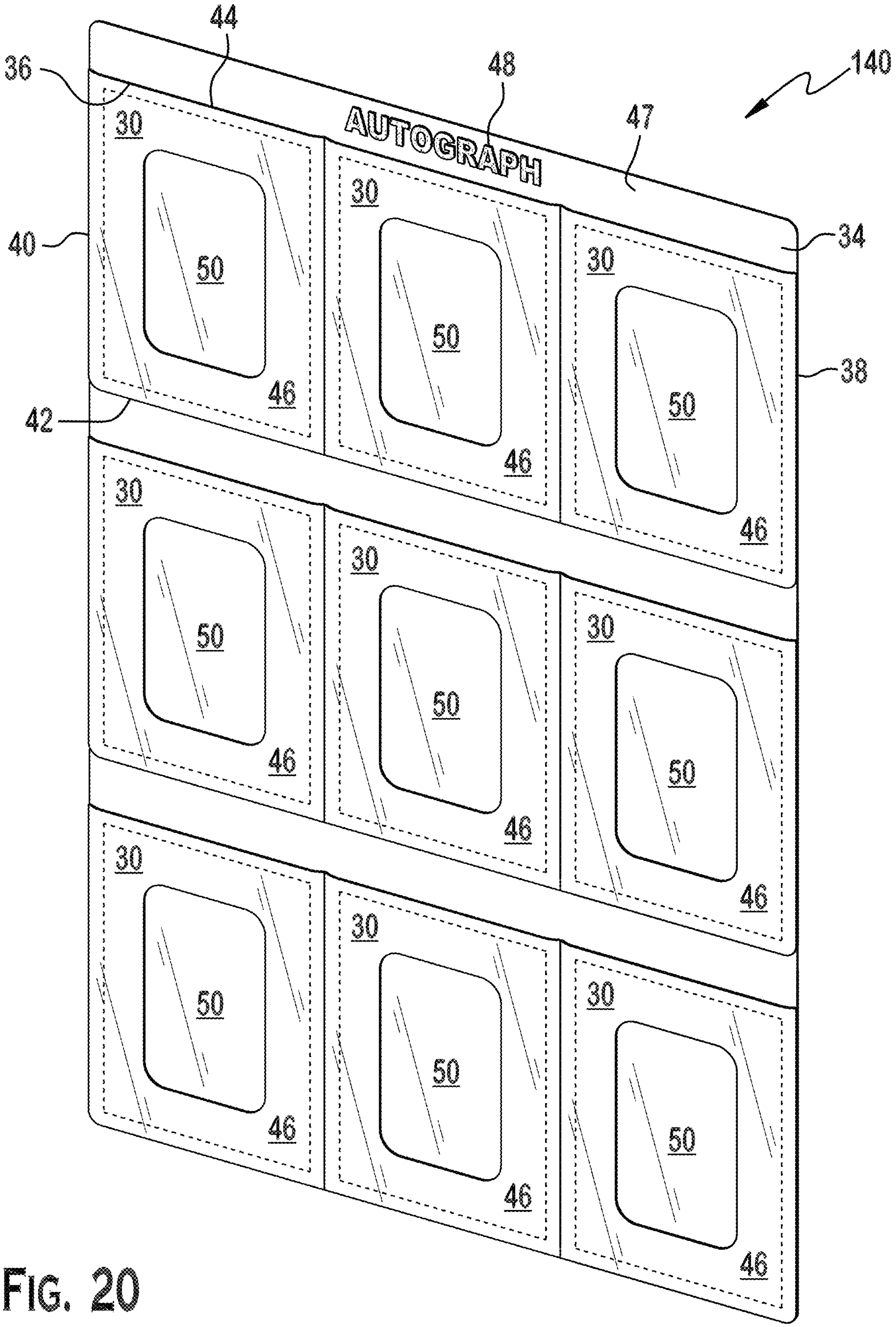
FIG. 20 is a three quarters perspective view of another embodiment of the case system of the present invention.

Referring now to FIG. 20, the case system may include a portfolio sheet 140 (herein also referred to as a "multi-case sheet system"). The portfolio sheet 140 preferably includes a plurality of portfolio bodies 30. The portfolio bodies 30 may each preferably include a first panel 32 and a second panel 34, wherein the second panel 34 has a border and the first panel 32 and the second panel 34 form a pocket 46 configured to receive a trading card 142. Preferably the first panel 32 and a second panel 34 are not completely opaque. More preferably the first panel 32 and second panel 34 and second panel 34 are transparent. Preferably the first panel 32 defines an aperture 50 therethrough. The second panel 34 may underlie the first panel 32 and preferably, but not necessarily, extends upwardly past the first edge of the first panel 32 to form a case system lip 47. The case system lip 47 is preferably large enough to accommodate texturing. More preferably the case system lip 47 has texturing in the form of embossment which forms a grip enhancement portion 48 of the case 30. More preferably the grip enhancement portion 48 of the case 30 is only present on the top of the portfolio sheet 140. Those of ordinary skill in the art will appreciate from this disclosure that the case system lip 47 and the grip enhancement portion 48 thereon, can be omitted without departing from the scope of the present invention.

Preferably between the first panel 32 and the second panel 34, the panels define a pocket 46. The pocket 46 (preferably defined by the first panel 32 and the remainder of portion of the second panel 34) may be accessed from a passageway 36 which may be defined by a mouth/opening formed by the space between the border 44 of the second panel 34 and a first edge of the first panel 32. Preferably the portfolio body 30 has a first, vertical joining edge 54 (herein also referred to as a “right minor surface”), a second vertical joining edge 56 (herein also referred to as a “left minor surface”), a first, horizontal joining edge 58 (herein also referred to as a “bottom minor surface”), and a second, horizontal joining edge 60 (herein also referred to as a “top minor surface”). More preferably the portfolio body 30 is engaged to at least three of the plurality of portfolio bodies 30 via separately one of the first vertical joining edge 52, the second vertical joining edge 54, the first horizontal joining edge 56 and the second horizontal joining edge 58 thereof such that the portfolio sheet 140 is formed out of the plurality of portfolio bodies 30. Preferably trading cards 142 stored within the pocket 46 are friction fit in place. Preferably transporting the trading cards 142 in the case system will prevent them from being damaged and or bent. Those of ordinary skill in the art will appreciate from this disclosure that the case system lip 47 can be omitted or replaced with a multi-layer or multi-component piece without departing from the scope of the present invention.

Still referring to FIG. 20, the portfolio sheet 140 may have a portion that protrudes from one transverse edge (for example the edge along the left vertical side of the portfolio sheet 140) of the portfolio sheet 140 into which binder ring holes can, or have been, formed such that the portfolio sheet 140 can be secured into a 3-ring binder, or the like. Those of ordinary skill in the art will appreciate from this disclosure that other methods of securing the portfolio sheet 140 into a binder, book, filing cabinet, or the like, such as an adhesive strip or hanging folder hooks can be used in place of or alongside the binder ring holes without departing from the scope of the present invention.

Figure 21:
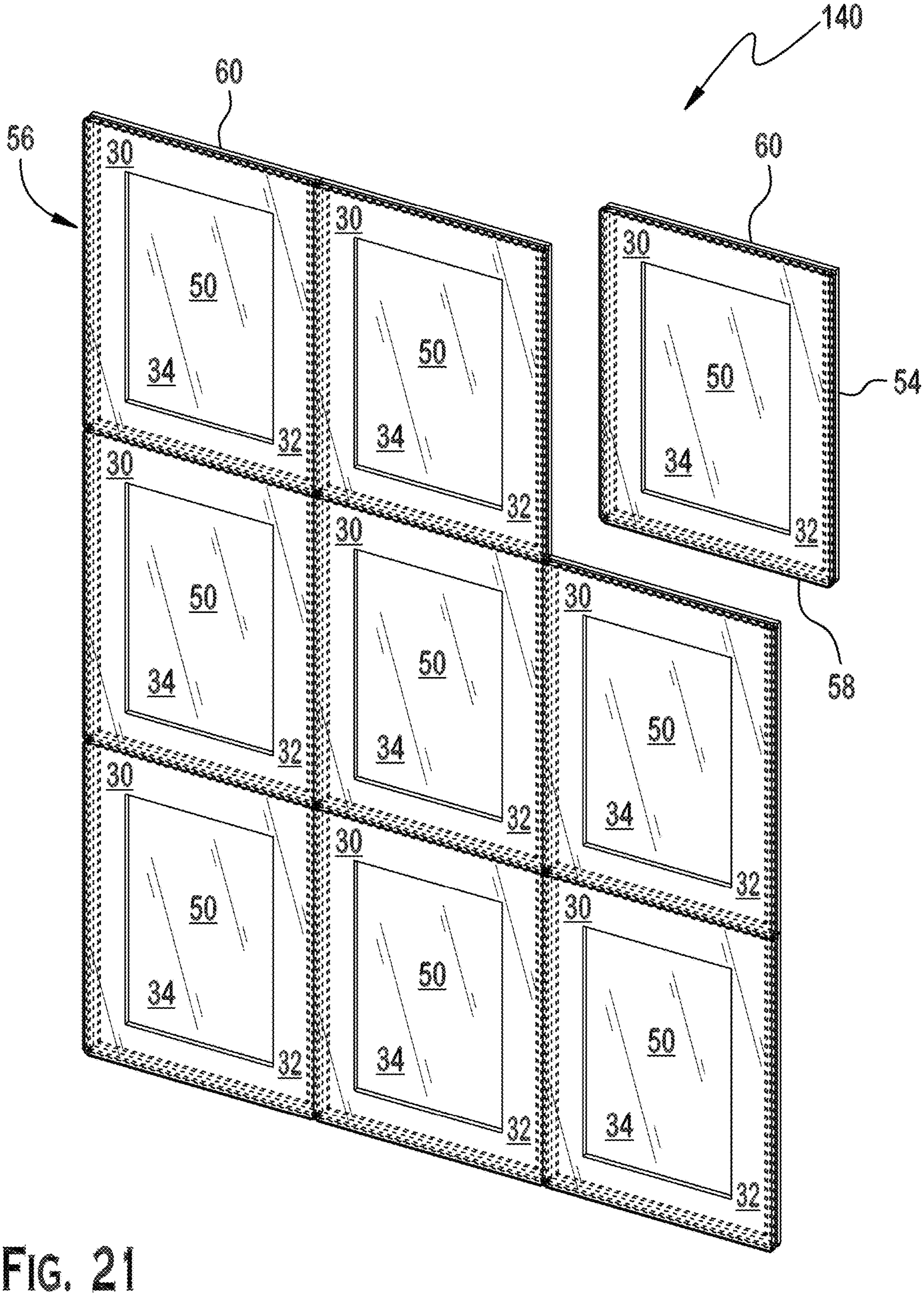
FIG. 21 is a three quarters perspective view of another embodiment of the case system of the present invention.
Figure 22:
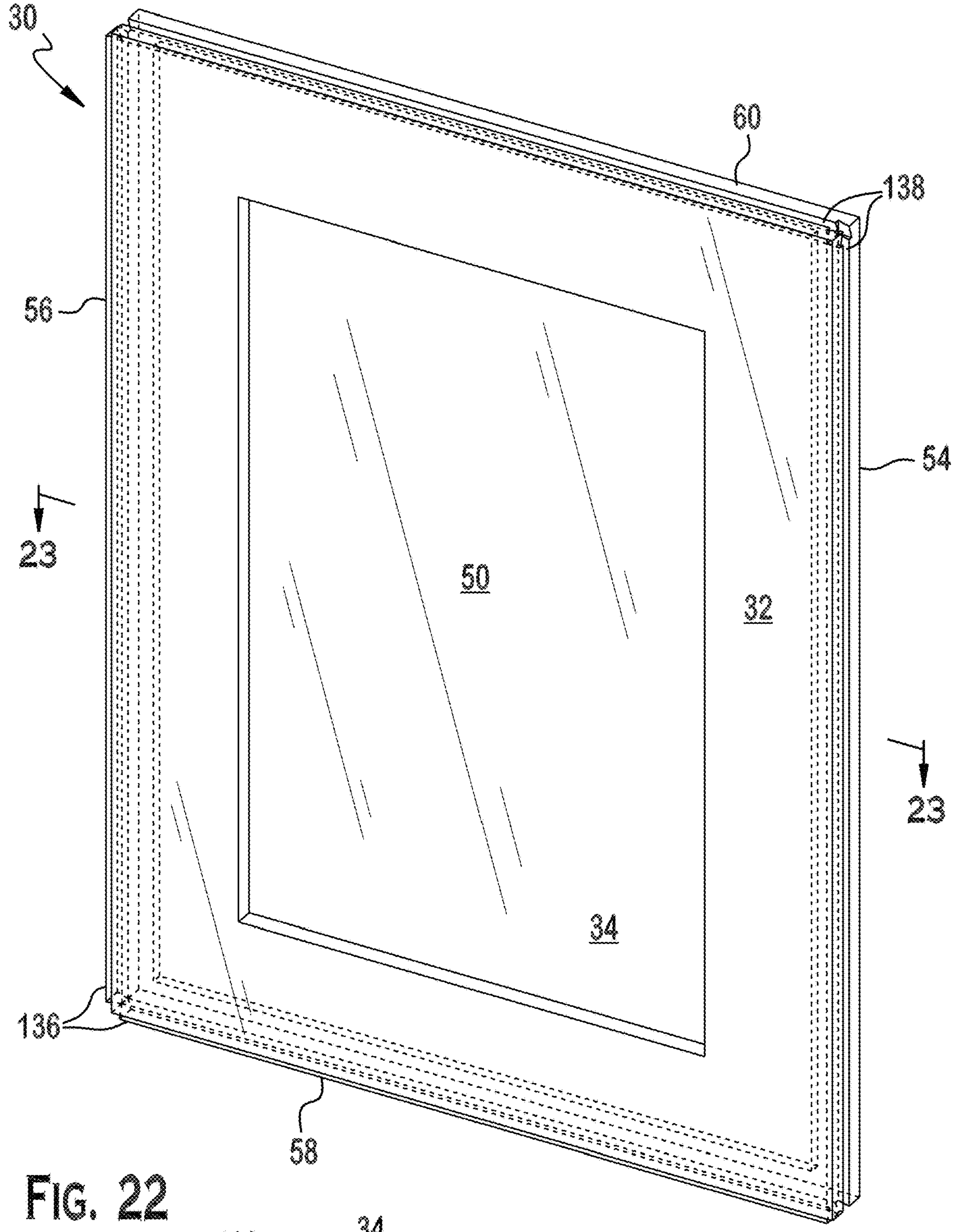
FIG. 22 is three quarters view of an individual portfolio body 30 of the case system shown in FIG. 21.
Figure 23:
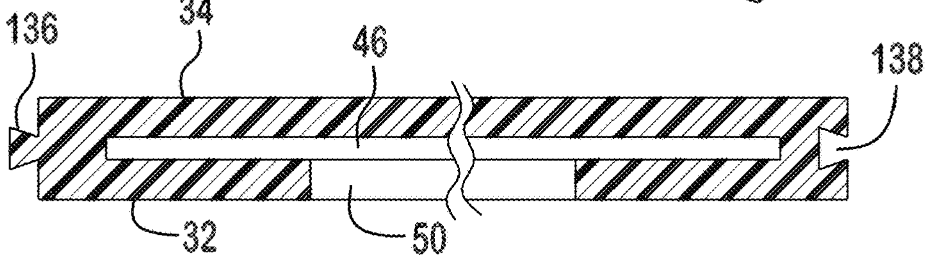
FIG. 23 is a cross-sectional view of the embodiment of the case 30 shown in FIG. 22 as taken along the lines 23-23.

Referring now to FIGS. 21-23, the case system may include a multi-case sheet system 140. The multi-case sheet system 140 may include a plurality of portfolio bodies 30. Preferably the portfolio bodies 30 further comprise a first major surface 32 and a second major surface 34, wherein the first major surface 32 and the second major surface 34 form a pocket 46 configured to receive a trading card 142. The portfolio bodies 30 also may have a top minor surface 60, a bottom minor surface 58, a left minor surface 56, and a right minor surface 54. Preferably the first major surface 32 and a second major surface 34 are not completely opaque. More preferably the first major surface 32 and a second major surface 34 are transparent. Preferably the first major surface 32 defines an aperture 50 therethrough. Preferably the portfolio body 30 has male joints 132 on its top minor surface 60, and its left minor surface 56 and female joints 130 on its bottom minor surface 58 and right minor surface 54. More preferably the profile body 30 can be detachably engaged to other portfolio bodies 30 by way of connecting a male joint 132 of one portfolio body 30 to the female joint 130 of another portfolio body 30 thereby creating a multi-case sheet system 140. More preferably the male joints 132 are comprised of male slide joints 136 and the female joints 130 are comprised of female slide joints 138 such that the portfolio units 30 in a multi-case sheet system 140 can be repeatedly joined and disconnected.

In a separate embodiment, the case system is an irregular shape such that it can accommodate trading cards 142 or other sports memorabilia that are also irregularly shaped. Additionally, the case system may be designed to accommodate more than one trading card 142 in the same pocket 46. More preferably the case system may be configured to hold an entire deck of trading cards 142 in a single pocket 46.

The case system is preferably made of a flexible, tough, protective, material such as polycarbonate. However, those of ordinary skill in the art will appreciate that the materials from which the case system is constructed can be varied without departing from the scope of the present invention. For example, the case system can be made of a pliable, clear, rigid, material such as plastic. By way of further example, the case system is preferably made of a pliant, translucent, not flexible, material such as polyethylene terephthalate. By way of yet another example, the case system can preferably be made of a protective, opaque, stiff, material such as polyvinyl chloride. Additional material from which the case system may be made are preferably soft, see through, unyielding, material such as a polymeric composite. Another alternative material from which the case system can be formed without departing from the scope of the present invention is a rigid, opaque, inflexible, material such as high-density polyethylene. By way of further example still, the case system may be made of a supple, not completely opaque, flexible, material such as low-density polyethylene without departing from the scope of the present invention. By way of further example still, the case system can be made of a pliant, not opaque, somewhat rigid material that can be injection molded such as plastic or polymer. By way of an alternative example, the case system can also be made by a thermoplastic polymer such as polycarbonate that is, strong, smooth, and does not completely occlude light. While particular materials have been described above for use with making the case system, those of ordinary skill in the art will appreciate from this disclosure that any suitable materials can be used without departing from the scope of the present invention.

While the preferred embodiment is disclosed above, those of ordinary skill in the art will appreciate from this disclosure that the structure of the case system can be varied without departing from the scope of the present invention. For example, one of ordinary skill in the art will appreciate from this disclosure that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention.

What is claimed is:

1. A method of presenting a trading card for autographing, comprising the steps of:

providing a case comprising:

a portfolio body having a first panel and a second panel, the first panel and the second panel forming a pocket configured to contain the training card;

the first panel defining an aperture therethrough; and wherein the first panel is configurable between a first, closed position in which the first panel is configured to overlie the trading card when the trading card is located within the portfolio body and a second open position in which the case is configured to allow direct access to a first portion of the trading card for signing when the trading card is located therein; and wherein the first, closed position includes a first groove joint meshing with a tongue joint to form a groove connection;

inserting a trading card into the portfolio body by moving the first panel from the first, closed position to the second, open position by detaching the first panel from the second panel;

orienting the trading card such that the first portion of the trading card on which an autograph is desired is aligned with the aperture while a second portion of the trading card is sandwiched between the first panel and the second panel.

2. The method of claim 1, wherein the groove connection is held through the force of friction.

3. A method of presenting a trading card for autographing, comprising the steps of:

providing a case comprising:

a portfolio body having a first panel and a second panel, the first panel and the second panel forming a pocket configured to contain the training card:

the first panel defining an aperture therethrough; and wherein the first panel is configurable between a first, closed position in which the first panel is configured to overlie the trading card when the trading card is located within the portfolio body and a second open position in which the case is configured to allow direct access to a first portion of the trading card for signing when the trading card is located therein; and wherein the first, closed position includes magnets that separably hold the first panel and the second panel;

inserting a trading card into the portfolio body by moving the first panel from the first, closed position to the second, open position by detaching the first panel from the second panel;

orienting the trading card such that the first portion of the trading card on which an autograph is desired is aligned with the aperture while a second portion of the trading card is sandwiched between the first panel and the second panel.

4. A method of presenting a trading card for autographing, comprising the steps of:

providing a case comprising:

a portfolio body having a first panel and a second panel, the first panel and the second panel forming a pocket configured to contain the training card;

the first panel defining an aperture therethrough; and wherein the first panel is configurable between a first, closed position in which the first panel is configured to overlie the trading card when the trading card is located within the portfolio body and a second open position in which the case is configured to allow direct access to a first portion of the trading card for signing when the trading card is located therein; and wherein the first, closed position includes a female snap joint meshes with a male snap joint, and the female snap joints mesh with the male snap joints by flexing over the male snap joints;

inserting a trading card into the portfolio body by moving the first panel from the first, closed position to the second, open position by detaching the first panel from the second panel;

orienting the trading card such that the first portion of the trading card on which an autograph is desired is aligned with the aperture while a second portion of the trading card is sandwiched between the first panel and the second panel.

5. A method of presenting a trading card for autographing, comprising the steps of:

providing a case comprising:

a portfolio body having a first panel and a second panel, the first panel and the second panel forming a pocket configured to contain the training card:

the first panel defining an aperture therethrough; and wherein the first panel is configurable between a first, closed position in which the first panel is configured to overlie the trading card when the trading card is located within the portfolio body and a second open position in which the case is configured to allow direct access to a first portion of the trading card for signing when the trading card is located therein; and wherein the first and second panels are not completely opaque;

inserting a trading card into the portfolio body by moving the first panel from the first, closed position to the second, open position by detaching the first panel from the second panel;

orienting the trading card such that the first portion of the trading card on which an autograph is desired is aligned with the aperture while a second portion of the trading card is sandwiched between the first panel and the second panel.

6. A method of presenting a trading card for autographing, comprising the steps of:

providing a case comprising:

a portfolio body having a first panel and a second panel, the first panel and the second panel forming a pocket configured to contain the training card;

the first panel defining an aperture therethrough; and wherein the first panel is configurable between a first, closed position in which the first panel is configured to overlie the trading card when the trading card is located within the portfolio body and a second open position in which the case is configured to allow direct access to a first portion of the trading card for signing when the trading card is located therein; and wherein the first and second panels are transparent;

inserting a trading card into the portfolio body by moving the first panel from the first, closed position to the second, open position by detaching the first panel from the second panel;

orienting the trading card such that the first portion of the trading card on which an autograph is desired is aligned with the aperture while a second portion of the trading card is sandwiched between the first panel and the second panel.

7. A method of presenting a trading card of autographing, comprising the steps of:

providing a case comprising:

a portfolio body having a first panel and a second panel, the first panel and the second panel forming a pocket configured to contain the training card;

the first panel defining an aperture therethrough; and wherein the first panel further comprises a pocket access door;

wherein the pocket access door is configurable between a first, closed position in which the pocket access door prevents removal of the trading card from the pocket when the trading card is located within the portfolio body and a second open position in which the case is configured to allow insertion of the trading card into the pocket such that direct access to a first portion of the trading card for autographing is possible via the aperture.

8. The method of claim 7, wherein when the pocket access door is in the first, closed position the pocket access door forms part of a perimeter of the case.

9. The method of claim 7, wherein the steps further comprise:

inserting a trading card into the portfolio body by of moving the pocket access door from the first, closed position to the second, open position by pivoting the pocket access door along a hinge;

orienting the trading card such that a first portion of the trading card on which an autograph is desired is aligned with the aperture while a second portion of the trading card is sandwiched between the first panel and the second panel.

10. The method of claim 7, wherein the case further comprises a door latch or a door pin.

11. The method of claim 7, wherein the step of providing the case further comprises the first and second panels not being completely opaque.

12. The method of claim 7, wherein the step of providing the case further comprises the first and second panels being transparent.

13. A method of presenting a trading card for autographing, comprising the steps of:

providing a case, comprising:

a portfolio body, the portfolio body comprising a top minor surface, a passageway, and a pocket configured to receive a trading card;

the portfolio body defining a front aperture and a rear aperture therethrough; and wherein the top minor surface defines the passageway, and the passageway of the portfolio body provides access to the pocket;

inserting a trading card into the portfolio body by sliding the trading card through the passageway into the pocket;

orienting the trading card such that the first portion of the trading card on which an autograph is desired is aligned with the front aperture while a second portion of the trading card is aligned with the rear aperture.

14. The method of claim 13, wherein the portfolio body further comprises a male slide joint and a female slide joint.

15. The method of claim 13, wherein the portfolio body is one of a plurality of portfolio bodies which forms a portfolio sheet.

16. The method of claim 15, wherein the portfolio body further comprises a male slide joint and a female slide joint that is configured to detachably engage at least one of the remainder of portfolio bodies which forms the portfolio sheet.

17. The method of claim 13, wherein the step of providing the case further comprises the first and second panels not being completely opaque.

18. The method of claim 13, wherein the step of providing the case further comprises the first and second panels being transparent.

* * * * *